(12) United States Patent
Price et al.

(10) Patent No.: US 11,206,364 B1
(45) Date of Patent: Dec. 21, 2021

(54) SYSTEM CONFIGURATION FOR PERIPHERAL VISION WITH REDUCED SIZE, WEIGHT, AND COST

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/115,566

(22) Filed: Dec. 8, 2020

(51) Int. Cl.
| H04N 7/00 | (2011.01) |
| H04N 5/265 | (2006.01) |
| H04N 5/247 | (2006.01) |
| H04N 13/239 | (2018.01) |
| G06T 5/00 | (2006.01) |
| H04N 5/232 | (2006.01) |
| G06T 7/33 | (2017.01) |
| G06T 5/50 | (2006.01) |
| H04N 13/00 | (2018.01) |

(52) U.S. Cl.
CPC ............ *H04N 5/265* (2013.01); *G06T 5/009* (2013.01); *G06T 5/50* (2013.01); *G06T 7/337* (2017.01); *H04N 5/23238* (2013.01); *H04N 5/247* (2013.01); *H04N 13/239* (2018.05); *G06T 2207/20221* (2013.01); *H04N 2013/0081* (2013.01)

(58) Field of Classification Search
CPC .......... G02B 27/017; G02B 2027/0138; G02B 2027/014; G02B 2027/0141; G02B 2027/0187; G02B 2027/0147; G02B 27/0172; G02B 2027/011; G02B 2027/0134; G02B 2027/0178
USPC .......................................... 348/36
See application file for complete search history.

(56) References Cited

U.S. PATENT DOCUMENTS

| 10,701,334 | B2 * | 6/2020 | DiVerdi | G02B 27/0172 |
| 2018/0160041 | A1 * | 6/2018 | Price | G02B 19/0014 |
| 2018/0348529 | A1 * | 12/2018 | Blum | G02B 27/0172 |
| 2019/0057537 | A1 * | 2/2019 | Ohba | G06T 15/20 |
| 2019/0101758 | A1 * | 4/2019 | Zhu | G02B 27/0093 |
| 2019/0114797 | A1 * | 4/2019 | Bleyer | G06T 15/04 |

\* cited by examiner

*Primary Examiner* — Masum Billah
(74) *Attorney, Agent, or Firm* — Workman Nydegger

(57) ABSTRACT

Improved HMDs are described. The HMD is configured to provide higher resolution image content within a central area of a display of the HMD and to provide lower resolution image content within peripheral areas of the display. The HMD includes a higher resolution camera, a first lower resolution camera, and a second lower resolution camera. The FOV of the first lower resolution camera minimally overlaps the FOV of the higher resolution camera, and the FOV of the second lower resolution camera minimally overlaps the FOV of the higher resolution camera. The minimal overlap is less than 10 degrees. By structuring the HMD in this manner, the HMD can generate merged images that mimic a user's foveal vision acuity.

20 Claims, 25 Drawing Sheets

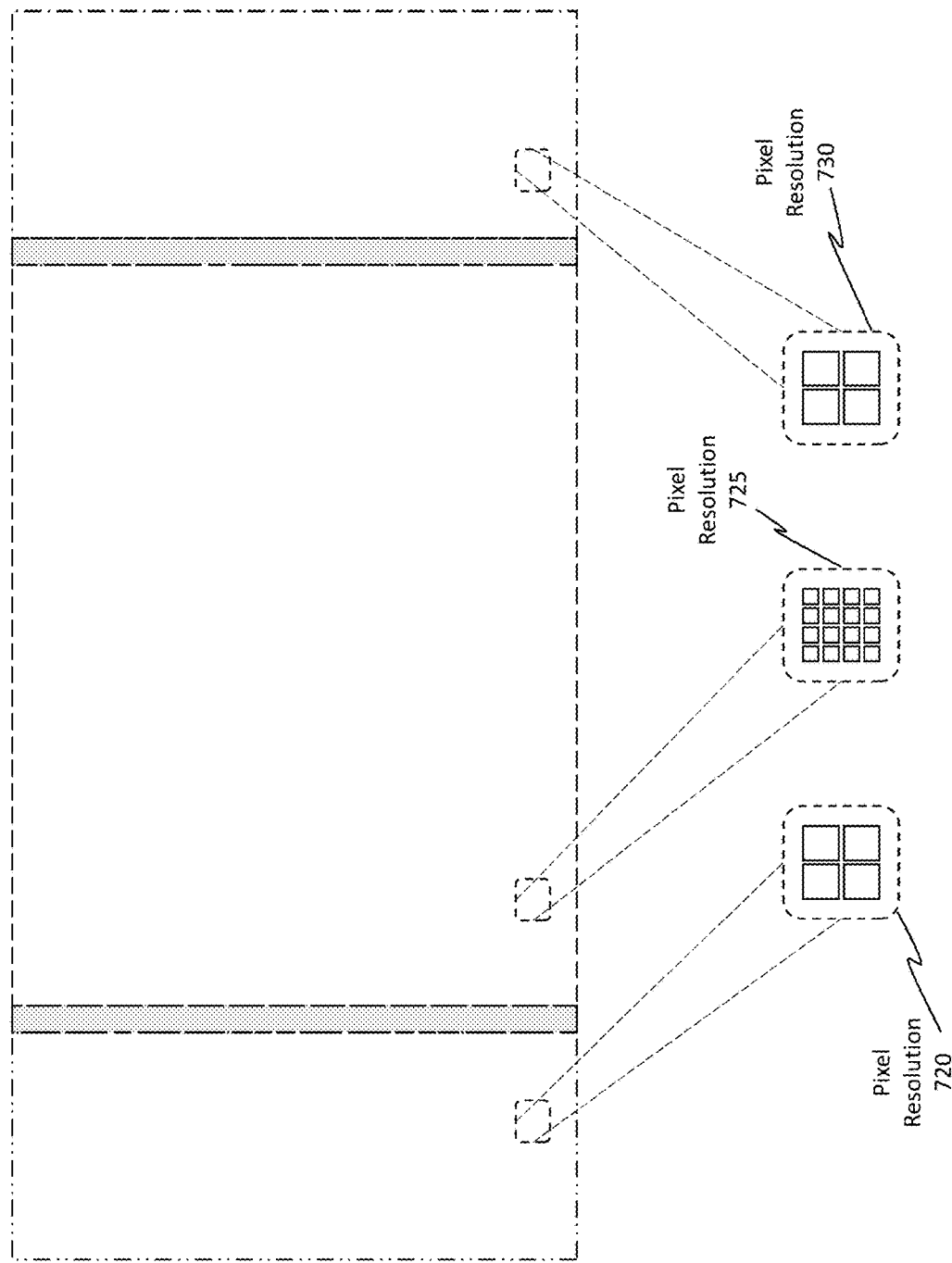

SYSTEM CONFIGURATION FOR PERIPHERAL VISION WITH REDUCED SIZE, WEIGHT, AND COST

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world. FIG. 1 illustrates an example HMD 100 that includes a display 105 for displaying virtual content.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. By way of example, the HMD 100 in FIG. 1 includes a first camera 110 and a second camera 115. A passthrough image or view can aid users in avoiding disorientation and/or safety hazards when transitioning into and/or navigating within a MR environment. The cameras 110 and 115 are used to generate the passthrough images.

FIG. 2 shows an example HMD 200 similar to that of HMD 100 of FIG. 1. HMD 200 includes a camera 205 and a camera 210. The camera 205 has a field of view FOV 215, and the camera 210 has a FOV 220. The FOV of a camera refers to the area that is observable by that camera. The FOV is influenced by the hardware features of the camera, such as the camera's lens. Notice, in the scenario presented in FIG. 2, the cameras 205 and 210 provide so-called "binocular vision" because the two cameras are located proximately to one another and because their FOVs substantially overlap. To illustrate, the FOV 215 and the FOV 220 overlap one another in the overlap 225 region. On the other hand, the two FOVs do not overlap in the non-overlap 230 region and the non-overlap 235 region. The overall FOV 240 illustrates the three different areas provided by this configuration (e.g., non-overlap 230, overlap 225, and non-overlap 235). The display of the HMD 200 can display the content that is detected within the overall FOV 240.

The two cameras 205 and 210 are typically quite expensive (e.g., over $1,000 each) and provide an expansive FOV. Expanding the FOV of the cameras results in each camera having a lower angular resolution (i.e. the number of pixels per angle, whereas spatial resolution is the total number of pixels) than what otherwise might be desirable. Structuring the camera's lenses to achieve wider FOVs results in lower angular resolution levels for those cameras. Notice, the structural configuration presented in FIG. 2 uses a portion of the camera's angular resolution for the peripheral or fringe areas.

FIG. 3 shows a resulting merged image 300 that is created by merging an image segment 305 (i.e. the area bounded by the dash-dash line) generated by the camera 205 with an image segment 310 (i.e. the area bounded by the dash-dot-dot line) generated by the camera 210. Because the cameras 205 and 210 had overlapping FOVs, the resulting image segments 305 and 310 also overlap, as shown by the overlap 315. Other areas do not overlap, as shown by non-overlap 320 and non-overlap 325. As a whole, the merged image 300 provides an expansive horizontal FOV 330. In some cases, this horizontal FOV 330 can be as wide as 80 degrees, but it comes at the expense of having reduced angular resolutions. The merged image 300 is displayed on the HMD's display as a passthrough image.

It should be noted that the overlap 315 area typically corresponds to a "central area" of the HMD's display while the non-overlap 320 and 325 areas are typically outer "peripheral areas" of the display. Because the higher angular resolution cameras were used in the HMD, this HMD structure results in a relatively even distribution of pixels across the entire horizontal FOV 330. To illustrate, the pixel resolution 340 illustrates the resolution within the non-overlap 320 area (i.e. one peripheral area); the pixel resolution 345 illustrates the resolution in the overlap 315 area (i.e. the central area); and the pixel resolution 350 illustrates the resolution in the non-overlap 325 area (i.e. a different peripheral area).

Notice, the pixel resolutions 340, 345, and 350 are relatively the same. One thing to note, human visual is foveal in nature, meaning vision acuity is highest at the eyeball's optical axis, and vision acuity progressively decreases nearer the eye's periphery. What this means is that traditional HMD systems are inefficiently designed when high resolution content is displayed in the peripheral areas of the HMD's display because human eyes are less acute at being able to view that high resolution content in the periphery.

Notably, there is a competing requirement of having excellent peripheral vision for situational awareness (e.g., detecting movement at the outer fringes of one's vision) and having high angular resolution on the camera sensor itself to enable the user to see objects that are very far away in a clear manner. What is needed, therefore, is an improved HMD structure designed to better mimic actual human vision acuity so as to not waste high resolution image pixels on areas of the HMD display that do not need high resolution.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods involving the use of an improved head mounted device (HMD). The HMD is configured to provide higher resolution image content within a central area of the HMD's display and to provide lower resolution image content within the display's peripheral areas.

In some embodiments, the HMD includes a higher resolution camera disposed at a central position on the HMD, where the higher resolution camera is configured to provide higher resolution image content within the display's central area. The HMD also includes a first lower resolution camera disposed at a first side position of the higher resolution camera on the HMD. The first lower resolution camera is configured to provide first lower resolution image content within a first peripheral area of the display. The field of view (FOV) of the first lower resolution camera minimally overlaps a FOV of the higher resolution camera. This minimal overlap is less than a 10 degree FOV overlap. The HMD includes a second lower resolution camera disposed on the HMD at a second side position of the higher resolution camera. The second lower resolution camera is configured to provide second lower resolution image content within a second peripheral area of the display. The FOV of the second lower resolution camera also minimally overlaps the FOV of the higher resolution camera, and this minimal overlap is also less than 10 degrees.

Some embodiments are configured to merge lower resolution image content with higher resolution image content within a merged image using a planar reprojection process. Such operations can be performed using the HMD structural configuration mentioned above. Initially, the embodiments obtain i) a higher resolution image from the higher resolution camera, ii) a first lower resolution image from the first lower resolution camera, and iii) a second lower resolution image from the second lower resolution camera. The embodiments select a depth to planarly reproject the first lower resolution image and the second lower resolution image. The selected depth is used to planarly reproject a first texture map plane represented by the first lower resolution image onto a texture map plane represented by the higher resolution image. Consequently, the first lower resolution image is planarly reprojected. The second lower resolution image is planarly reprojected in a similar manner. The embodiments then generate a merged image by combining the higher resolution image with the planarly reprojected first lower resolution image and the planarly reprojected second lower resolution image.

Some embodiments use a motion model to perform the merging operation. For example, the embodiments can obtain i) a higher resolution image from the higher resolution camera, ii) a first lower resolution image from the first lower resolution camera, and iii) a second lower resolution image from the second lower resolution camera. A portion of the first lower resolution image overlaps with a portion of the higher resolution image, and a portion of the second lower resolution image overlaps with a different portion of the higher resolution image. The embodiments perform feature matching to identify a first set of corresponding feature points that are common between the portion of the first lower resolution image that overlaps with the portion of the higher resolution image. Additionally, the embodiments perform feature matching to identify a second set of corresponding feature points that are common between the portion of the second lower resolution image that overlaps with the different portion of the higher resolution image. A motion model is computed using the first set of corresponding feature points and the second set of corresponding feature points. Based on the computed motion model, the embodiments generate a merged image by combining the higher resolution image with the first lower resolution image and with the second lower resolution image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 7A, 7B, 7C illustrate various attributes of the resulting merged image that is generated using the improved structural configuration.

DETAILED DESCRIPTION

Figure 1:
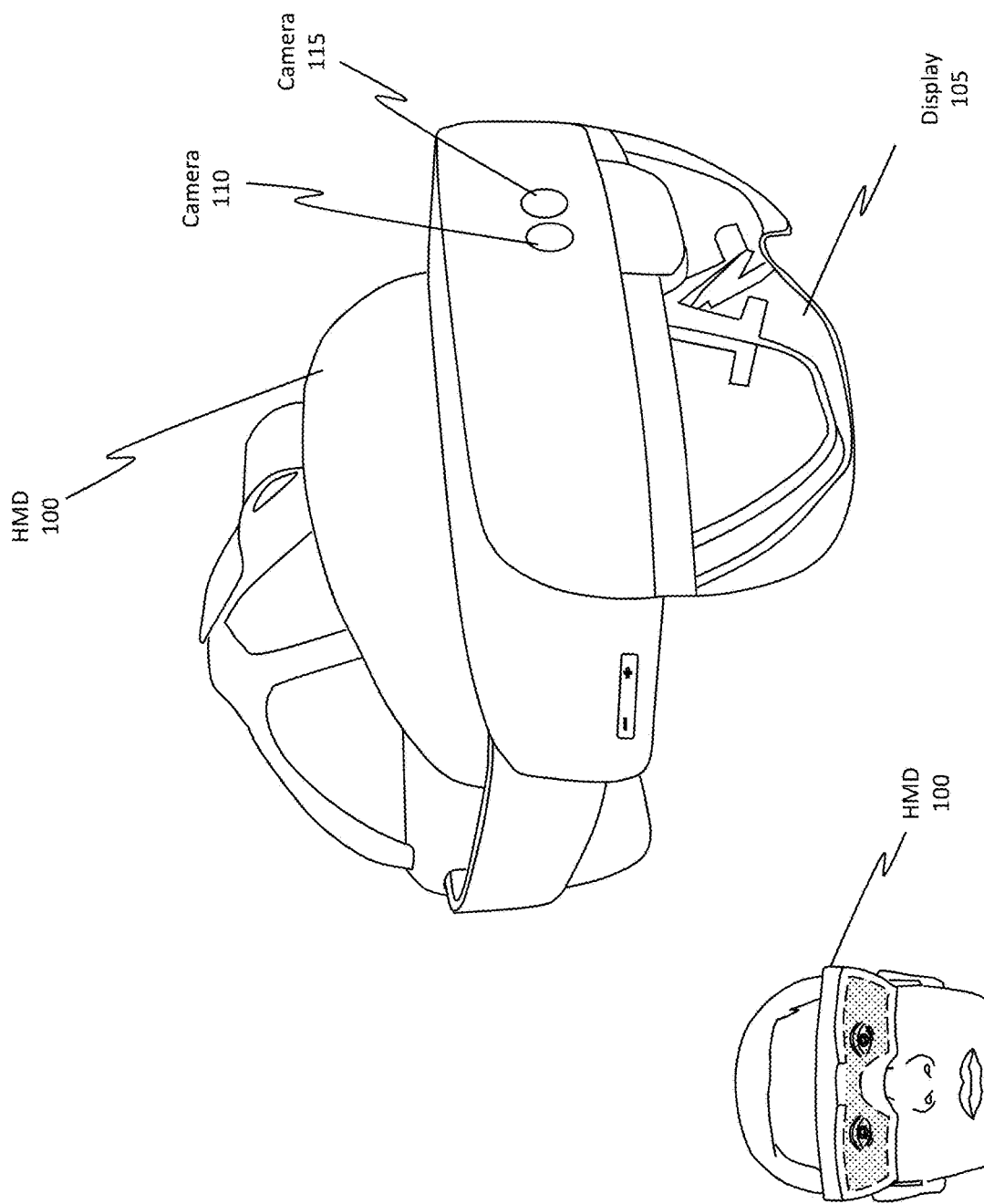
FIG. 1 illustrates an example HMD that uses two higher angular resolution cameras.

Embodiments disclosed herein relate to systems, devices (e.g., wearable devices, hardware storage devices, etc.), and methods involving the use of an improved head mounted device (HMD). The HMD is configured to provide higher resolution image content within a central area of the HMD's display and to provide lower resolution image content within the display's peripheral areas.

In some embodiments, a HMD includes a higher resolution camera, a first lower resolution camera, and a second lower resolution camera. The FOV of the first lower resolution camera minimally overlaps the FOV of the higher resolution camera, and the FOV of the second lower resolution camera minimally overlaps the FOV of the higher resolution camera. The minimal overlap between the FOV of the first lower resolution camera and the FOV of the higher resolution camera is less than a 10 degree FOV overlap. The overlap between the second lower resolution camera and the higher resolution camera is also less than 10 degrees.

Some embodiments use planar reprojection to merge the resulting images generated by the higher resolution camera and the lower resolution cameras. Initially, a higher resolution image, a first lower resolution image, and a second lower resolution image are obtained from the cameras. A depth is selected to planarly reproject the first and second lower resolution images. A merged image is generated by combining the higher resolution image with the planarly reprojected first lower resolution image and the planarly reprojected second lower resolution image.

Some embodiments use a motion model to perform the merging operation. After the images mentioned above are acquired, feature matching is performed to identify common feature points between the various images. A motion model is computed using these identified feature points. Based on the computed motion model, the embodiments generate a merged image by combining the higher resolution image with the first lower resolution image and with the second lower resolution image.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Substantial benefits may be achieved by practicing the disclosed principles. For example, using the disclosed structural configuration of the HMD effectively mimics a human's foveal vision acuity. As a consequence, the embodiments can refrain or avoid wasting high resolution pixels in areas of the display that a user likely will not spend much time looking at, such as the peripheral areas. Instead of having higher resolution pixels at the peripheral areas of the display, the embodiments use lower resolution pixels and maximize image resolution in the display's central area. Lower resolution pixels are sufficient in the peripheral areas because those pixels still provide the user with a sense of spatial or situational awareness, such as the ability to detect general movement. If movement is detected, the user can then shift his/her gaze toward that detected movement, thereby bringing the movement into the display's high resolution central area. Accordingly, substantial benefits are achieved via use of the disclosed HMD structure.

Substantial improvements are also achieved by performing the disclosed merging operations. Planar reprojection operations or motion models can be used to merge lower resolution images with higher resolution images. Additional tapering or feathering can be performed in overlap regions in order to progressively transition from higher resolution image content to lower resolution image content. This tapering improves the user's viewing experience and prevents unsightly jumps in image resolution. Additionally, merging the lower resolution images with the higher resolution images in the disclosed manner provides the user with a visually pleasing passthrough image that mimics the user's foveal vision acuity.

The disclosed concepts are generally focused on harnessing the fact that different camera sensors can be used for different purposes in an efficient manner. For example, there is no need to use an expensive high resolution camera to generate peripheral image content. Instead, a cheaper, smaller, and lighter camera can be used for that purpose. Also, there is no need to use higher angular resolution image pixels for the peripheral areas. Instead, lower resolution image pixels can be used for that purpose. The higher resolution camera can be efficiently used to generate content for display only within the display's central area.

By structuring the HMD in the disclosed manner, additional benefits are achieved as well. For example, the size of the HMD can be reduced, the weight of the HMD can be reduced, and the cost is substantially reduced, all due to smaller, lighter, and cheaper hardware components being used. Additionally, the disclosed structure provides improved situational awareness and an enhanced ability to recognize objects in the center due to the increased angular resolution. In this regard, the embodiments use reduced resolution camera sensors to display content around the edges or periphery of the HMD's display in order to expand the peripheral vision of the device.

Further benefits include reduced processing performed by the computer system. This reduced processing results in reduced power requirements and even reduced heat generation. By way of example, the smaller and lighter camera sensors will consume less power and will occupy less space on the HMD. Even though the HMD might transition from using two camera (large and expensive) to using three cameras (one large and two smaller), the overall power usage of the device is decreased with the new configuration. Reduced power usage leads to increased battery longevity and reduced heat generation. Accordingly, these and other benefits will be discussed in more detail throughout the remaining portions of this disclosure.

Example MR Systems and HMDs

Figure 4:
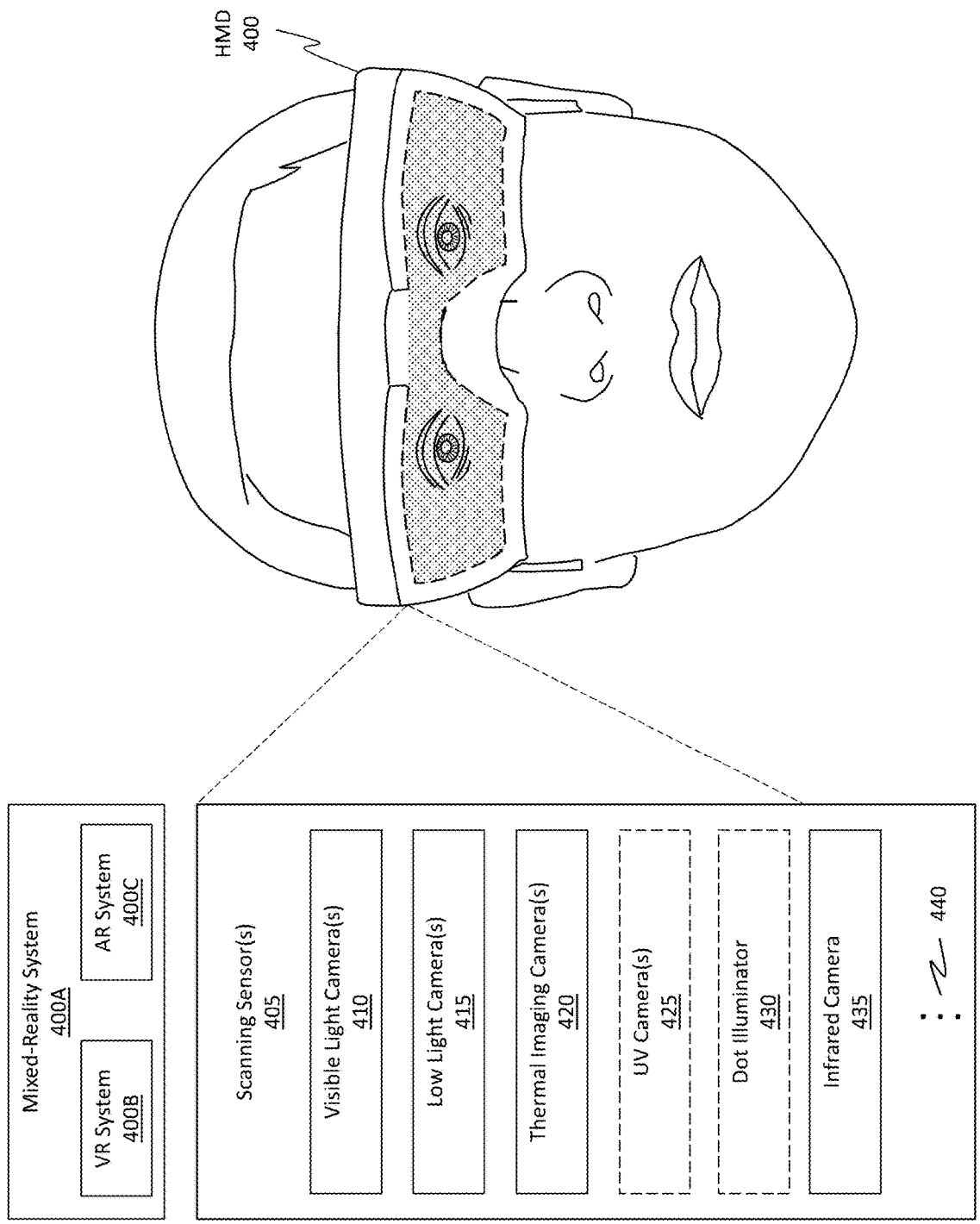
FIG. 4 illustrates an example HMD.

Attention will now be directed to FIG. 4, which illustrates an example of a head mounted device (HMD) 400. HMD 400 can be any type of MR system 400A, including a VR system 400B or an AR system 400C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 400 is shown as including scanning sensor(s) 405 (i.e. a type of scanning or camera system), and HMD 400 can use the scanning sensor(s) 405 to scan environments, map environments, capture environmental data, and/or generate any kind of images of the environment (e.g., by generating a 3D representation of the environment or by generating a "passthrough" visualization). Scanning sensor(s) 405 may comprise any number or any type of scanning devices, without limit.

In accordance with the disclosed embodiments, the HMD 400 may be used to generate a passthrough visualization of the user's environment. As used herein, a "passthrough" visualization refers to a visualization that reflects the perspective of the environment from the user's point of view. To generate this passthrough visualization, the HMD 400 uses its scanning sensor(s) 405 to scan, map, or otherwise record its surrounding environment, including any objects in the environment, and to pass that data on to the user to view. As will be described later, various transformations may be applied to the images prior to displaying them to the user to ensure the displayed perspective matches the user's expected perspective.

To generate a passthrough image, the scanning sensor(s) 405 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 400. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "merged image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 405 include visible light camera(s) 410, low light camera(s) 415, thermal imaging camera(s) 420, potentially (though not necessarily, as represented by the dotted box in FIG. 4) ultraviolet (UV) camera(s) 425, potentially (though not necessarily, as represented by the dotted box) a dot illuminator 430, and even an infrared camera 435. The ellipsis 440 demonstrates how any other type of camera or camera system (e.g., depth cameras, time of flight cameras, virtual cameras, depth lasers, etc.) may be included among the scanning sensor(s) 405.

It should be noted that any number of cameras may be provided on the HMD 400 for each of the different camera types (aka modalities). That is, the visible light camera(s) 410 may include 1, 2, 3, 4, 5, 6, 7, 8, 9, 10, or more than 10 cameras. Often, however, the number of cameras is at least 2 so the HMD 400 can perform passthrough image generation and/or stereoscopic depth matching, as described earlier. Similarly, the low light camera(s) 415, the thermal imaging camera(s) 420, and the UV camera(s) 425 may each respectively include 1, 2, 3, 4, 5, 6, 7, 8, 9, 10, or more than 10 corresponding cameras.

Improved Camera Configuration

Figure 5:
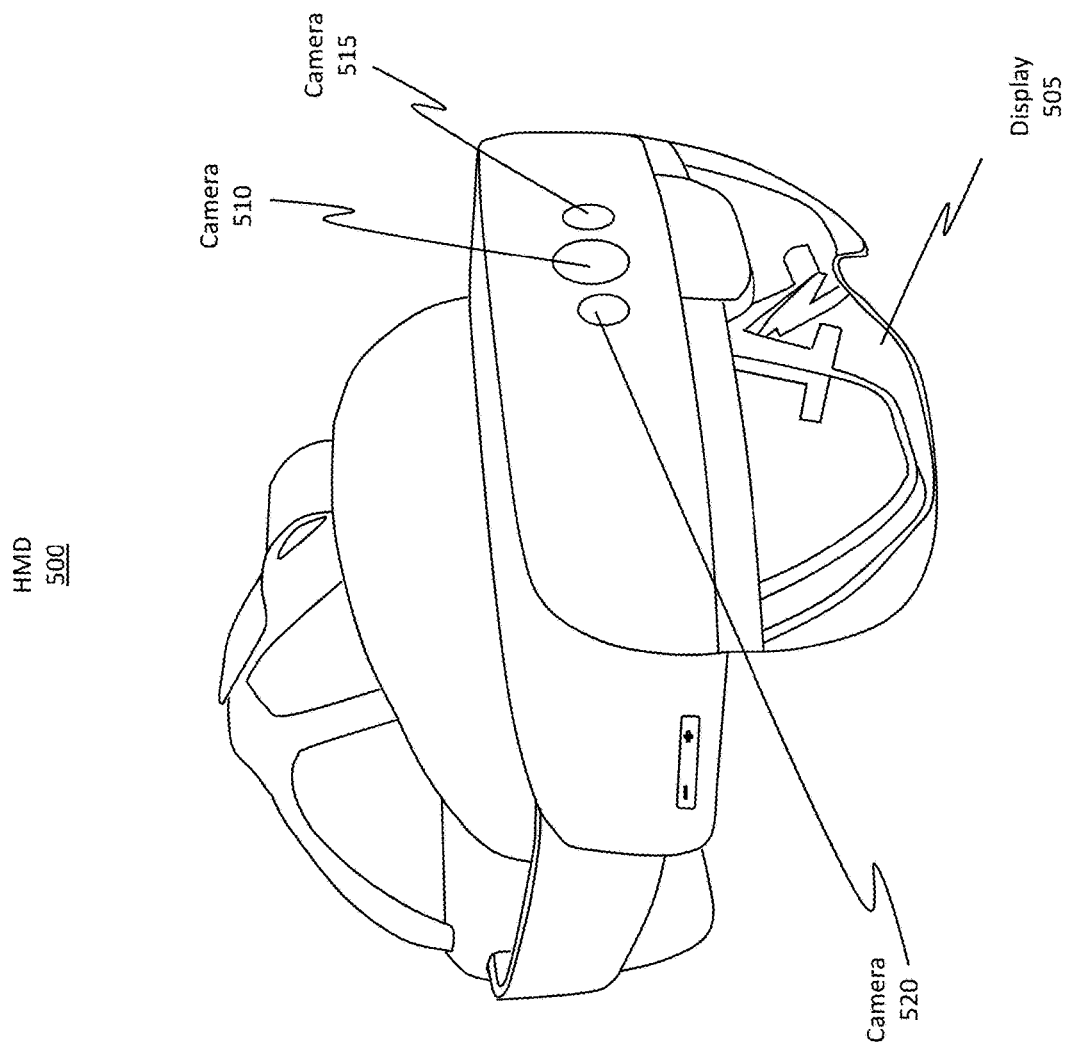
FIG. 5 illustrates an improved configuration of the HMD, where the improvements include the use of a higher resolution camera, a first lower resolution camera, and a second lower resolution camera, and where the positions of these cameras results in a configuration that closely mimics a user's foveal vision acuity.

FIG. 5 illustrates an HMD 500, which is representative of the HMD 400 of FIG. 4. HMD 500 includes a display 505 as well as a number of cameras. In contrast to the HMD 100 of FIG. 1, HMD 500 is a type of HMD configured to provide higher resolution image content within a central area of the display 505 and to provide lower resolution image content within peripheral areas of the display 505. To accomplish this, the HMD 500 is outfitted with a higher resolution camera 510 disposed on the HMD 500 at a central position. Notably, the higher resolution camera 510 is configured to provide the higher resolution image content within the central area of the display 505. The higher resolution camera 510 can have a pixel spatial resolution of 1268×720.

HMD 500 also includes a first lower resolution camera 515 disposed on the HMD 500 at a first side position of the higher resolution camera 410. The first lower resolution camera 515 is configured to provide first lower resolution image content within a first peripheral area of the display 505.

Figure 2:
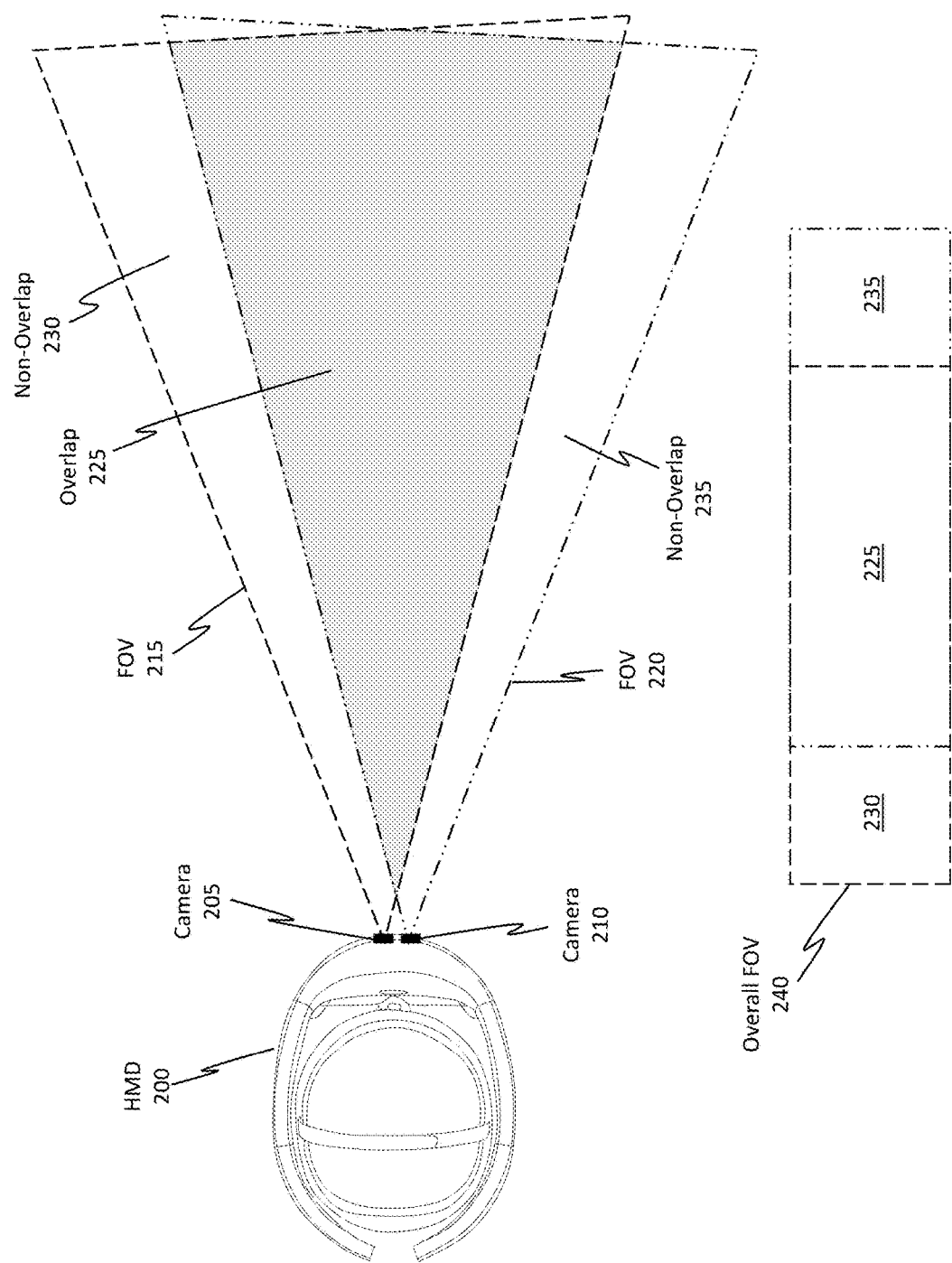
FIG. 2 illustrates how the fields of view (FOV) of those two cameras overlap extensively.
Figure 3:
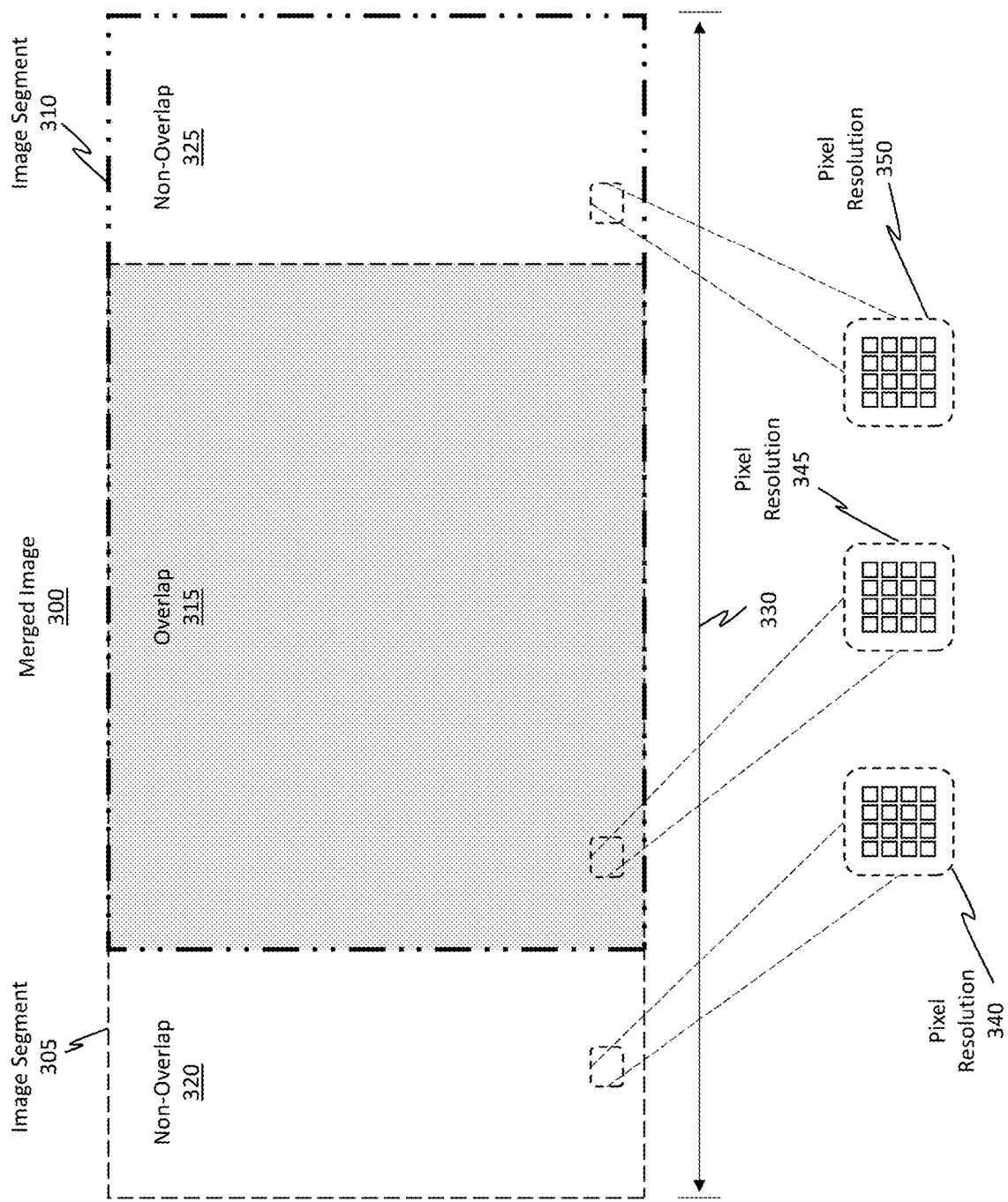
FIG. 3 illustrates how the resulting merged image generated from the two cameras includes a substantial amount of overlap and also includes higher resolution pixels at the peripheral regions of the merged image.

HMD 500 also includes a second lower resolution camera 520 disposed on the HMD 500 at a second side position of the higher resolution camera 510. The second lower resolution camera 520 is configured to provide second lower resolution image content within a second peripheral area of the display 505. The first and second lower resolution cameras 515 and 520 can be a quarter VGA camera (i.e. a QVGA camera) with a pixel spatial resolution of 320×240. Beneficially, QVGA cameras are substantially cheaper than the higher resolution camera 510, with cost savings reaching potentially reaching 40% as compared to the configuration described in FIGS. 1-3.

Figure 6:
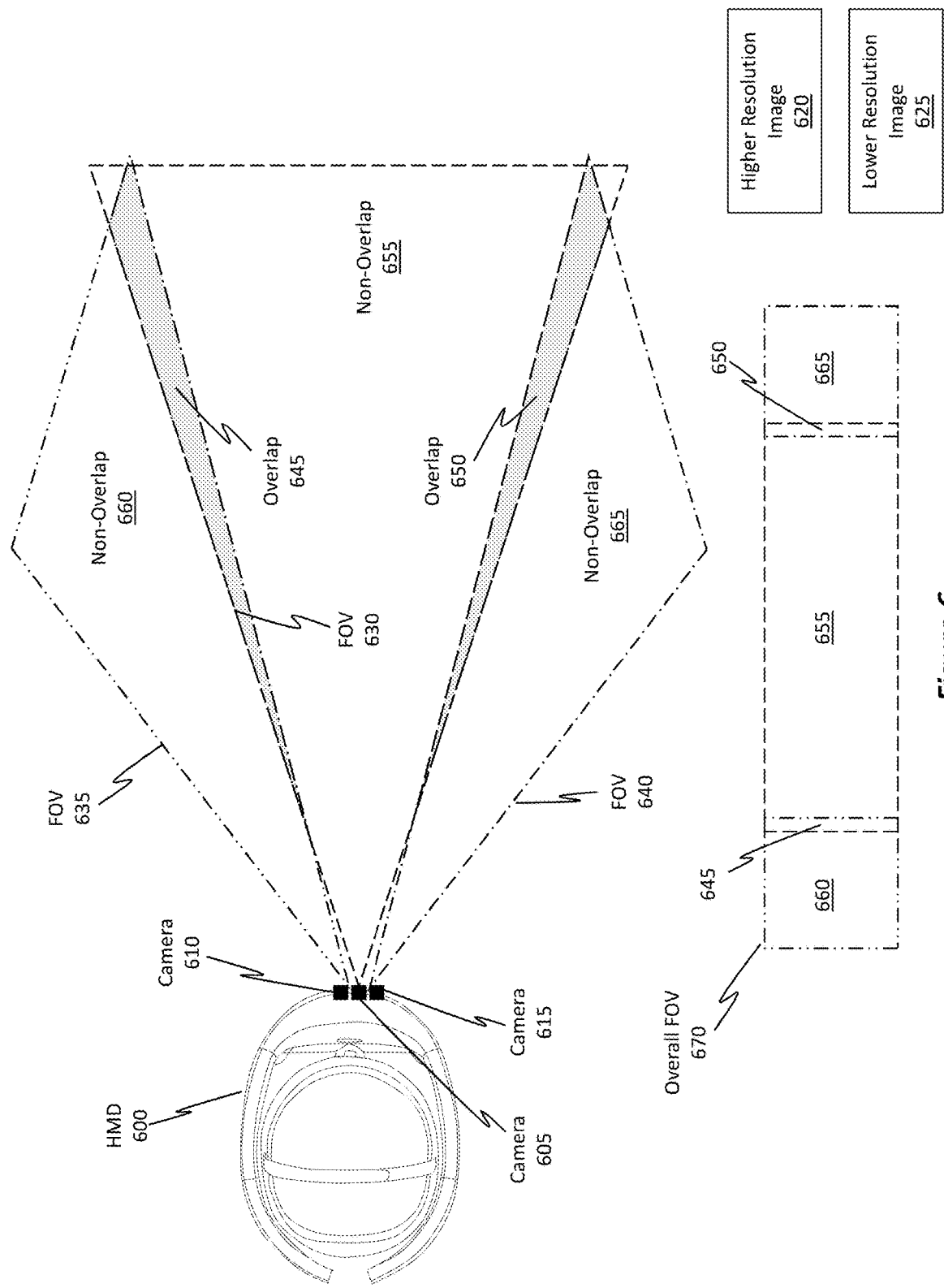
FIG. 6 illustrates how there is only a minimal amount of overlap between the FOVs of the different cameras.

The higher resolution camera 510, the first lower resolution camera 515, and the second lower resolution camera 520 are camera types included within a group of camera types comprising visible light cameras, low light cameras, thermal imaging cameras, and infrared cameras. FIG. 6 provides additional details regarding how the various cameras are structured and used.

FIG. 6 shows a HMD 600, a higher resolution camera 605, a first lower resolution camera 610, and a second lower resolution camera 615, which are representative of their corresponding items as described in FIG. 5. The higher resolution camera 605 produces or generates a higher resolution image 620, and the lower resolution cameras 610 and 615 produce lower resolution images, as shown by lower resolution image 625.

The higher resolution camera 605 is shown as having a FOV 630; the first lower resolution camera 610 is shown as having a FOV 635; and the second lower resolution camera 615 is shown as having a FOV 640. In accordance with the disclosed principles, the FOV 635 of the first lower resolution camera 610 minimally overlaps the FOV 630 of the higher resolution camera 605. This minimal overlap is less than a 10 degree FOV overlap. For example, the overlap may be 10 degrees, 9 degrees, 8, 7, 6, 5, 4, 3, 2, or even 1 degree overlap in a horizontal overlap direction. The overlap 645 represents the so-called "minimal overlap" that is present between the FOV 635 and the FOV 630.

Similarly, the FOV 640 of the second lower resolution camera 615 minimally overlaps the FOV 630 of the higher resolution camera 605. This minimal overlap is also less than a 10 degree FOV overlap. For example, the overlap map be 10 degrees, 9, 8, 7, 6, 5, 4, 3, 2, or even 1 degree overlap in the horizontal overlap direction. The overlap 650 represents the minimal overlap condition between the FOV 640 and the FOV 635.

Stated differently, the total amount of overlap between the three cameras can be less than 20% of the overall display portion that is included within the so-called "central area." Of course, the percentage amount may be different, such as 15%, 10%, 5%, or even less than 5%.

As a result of this structural configuration, majority portions of the FOV 630, 635, and 640 are non-overlapping with other FOVs. For example, the non-overlap 655 illustrates how a majority of the viewable area of the FOV 630 does not overlap with the FOV from another camera. Likewise, the non-overlap 660 and non-overlap 665 illustrate similar scenarios.

Configuring the cameras 605, 610, and 615 on the HMD 600 in this manner produces an overall FOV 670 of the display. The overall FOV 670 of the display includes the non-overlap 655, 660, and 665 areas as well as the overlap 645 and 650 areas. Therefore, in contrast to the overall FOV 240 of FIG. 2 where most portions of the overall FOV 240 included overlapping content, the overall FOV 670 is configured so that most portions of the overall FOV 670 are non-overlapping.

The overall FOV 670 of the display in which image content is displayed is at least 60 degrees wide. Optionally, the FOV 630 of the higher resolution camera 605 is at least 50 degrees wide (i.e. the central area of the display is at least 50 degrees wide), meaning the resulting 10 degrees are provided by the peripheral areas.

Of course, the FOVs may be even wider. For example, the overall FOV 670 may be 65 degrees wide, 70, 80, or even 85 degrees wide. Likewise, the FOV 630 may be 51 degrees wide, 52, 53, 54, 55, 56, 57, 58, 59, 60, 61, 62, 63, 64, 65, 66, 67, 68, 69, or even 70 degrees wide. In some instances, the FOV 630 may be larger than 70 degrees. In any event, FIG. 7A illustrates some of the benefits of this new configuration.

Figure 7A:
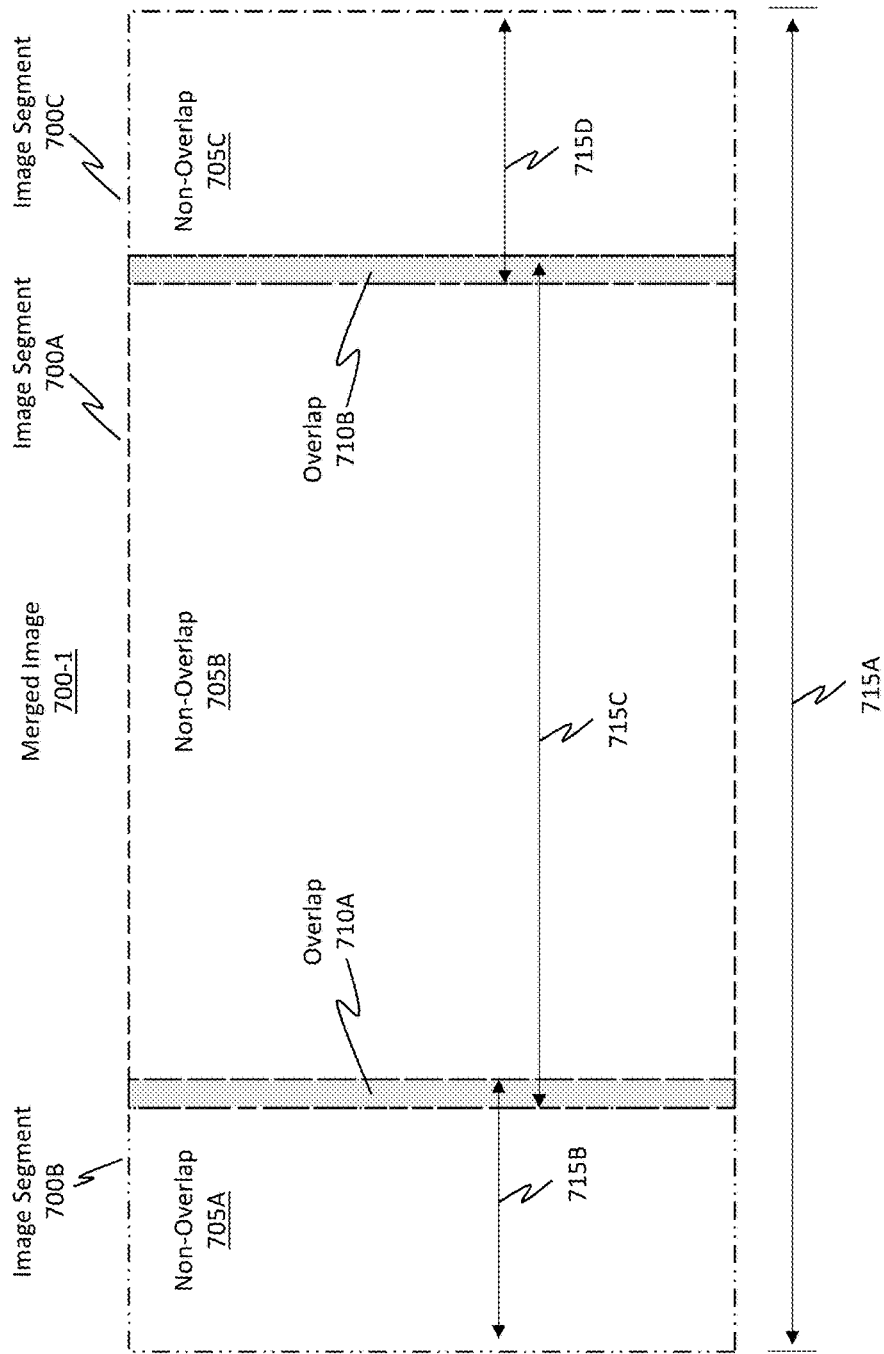

FIG. 7A shows a resulting merged image 700-1 that is generated using the configuration outlined in FIG. 6. The merged image 700-1 is formed from 1) an image segment 700A, which is generated using the higher resolution camera 605, 2) an image segment 700B, which is generated using the first lower resolution camera 610, and 3) an image segment 700C, which is generated using the second lower resolution camera 615. The three images, or image segments, are stitched, merged, or otherwise fused together. This merging will be described in more detail later.

Because the FOVs of the different cameras only minimally overlap, the resulting image segments also only minimally overlap. To illustrate, there is a non-overlap 705A area for the image segment 700B, a non-overlap 705B area for the image segment 700A, and a non-overlap 705C area for the image segment 700C. Relatedly, there is an overlap 710A area between the image segments 700A and 700B, and there is an overlap 710B area between the image segments 700A and 700C. The overlap and non-overlapping areas in the merged image 700-1 are formed based on the overlap and non-overlapping areas of the cameras FOVs.

By merging the different image segments together to form the merged image 700-1, which is displayed on the HMD's display as a passthrough image, the horizontal width or FOV of the merged image (i.e. horizontal FOV 715A) is larger than the singular horizontal FOVs of the respective image segments. That is, the image segment 700B is shown as having a horizontal FOV 715B; the image segment 700A is shown as having a horizontal FOV 715C; and the image segment 700C is shown as having a horizontal FOV 715D. As described earlier, the horizontal FOV 715A of the merged image 700-1 (which is displayed in the HMD's display) can be between 60 degrees and 85 degrees wide. It should be noted that the vertical FOV of the display (and also that of the merged image 700-1) is at least 40 degrees, though it may be larger (e.g., 45 degrees, 50, 55, 60, or more than 60 degrees).

By configuring the higher resolution camera to have a higher angular and spatial resolution than the angular and spatial resolution of the lower resolution cameras, the embodiments are able to more accurately mimic the foveal vision acuity of a human user's eye. FIG. 7B shows a merged image 700-2, which is representative of the merged image 700-1 of FIG. 7A. This figure illustrates the different resolutions that are provided on the HMD's display (by displaying the merged image 700-2) via use of the disclosed camera configuration.

Specifically, for the left-hand peripheral area corresponding to the image segment 700B, the merged image 700-2 provides a pixel resolution 720. For the central area corresponding to image segment 700A, the merged image 700-2 provide a pixel resolution 725. For the right-hand peripheral area corresponding to the image segment 700C, the merged image 700-2 provides a pixel resolution 730. Notice, the pixel densities/resolutions are different for the different pixel resolutions 720, 725, and 730.

The pixel resolution 725 is most dense because it located at the central viewing area where a user will direct his/her eyes most of the time. The resolutions 720 and 730 of the peripheral areas are purposely designed to be lower because the user's eyes do not need to have high resolution content displayed in the peripheral areas. Whereas the merged image 300 of FIG. 3 effectively wasted high resolution pixels in the peripheral areas, the disclosed embodiments beneficially maximize or concentrate the high resolution pixels in the central area of the display and use lower resolution pixels in the peripheral areas of the display.

Figure 7C:
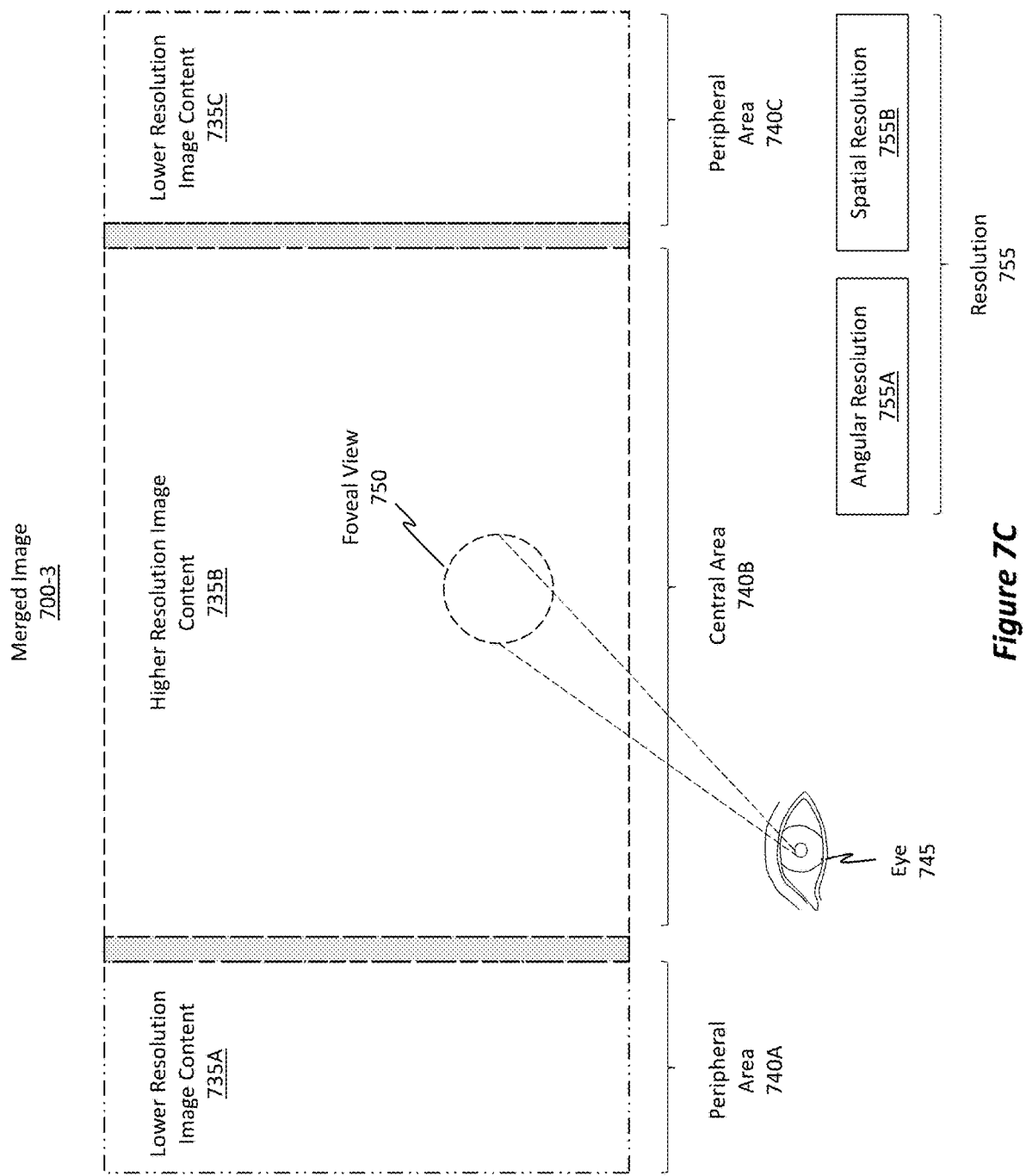

FIG. 7C shows a merged image 700-3 representative of the merged images discussed thus far. Merged image 700-3 includes lower resolution image content 735A, higher resolution image content 735B, and lower resolution image content 735C. The lower resolution image content 735A is displayed in a peripheral area 740A of the display; the higher resolution image content 735B is displayed in a central area 740B of the display; and the lower resolution image content 735C is displayed in a peripheral area 740C. Such a configuration mimics the foveal vision acuity of a human. For example, FIG. 7C shows a user's eye 745 looking at the merged image 700-3 using a foveal view 750. Maximum pixel resolution is provided in the central area 740B while lower pixel resolution is provided in the peripheral areas 740A and 740C.

Accordingly, the resolution 755 of the merged image 700-3 is variable depending on where image content is displayed on the HMD's display. It should be noted that the resolution 755 includes both angular resolution 755A and spatial resolution 755B. Angular resolution 755B refers to the number of pixels per degree across a FOV. The higher resolution camera is structured to have higher angular resolution as compared to the angular resolution of the lower resolution cameras. Spatial resolution 755B simply refers to the number of pixels used to construct an image, without regard to the number of pixels per degree.

Accordingly, the higher resolution camera provides higher angular resolution image content and higher spatial resolution image content in the display as compared to image content provided in the display by the first lower resolution camera or the second lower resolution camera. Optionally, a resolution of the first lower resolution camera is less than one-third a resolution of the higher resolution camera. Similarly, a resolution of the second lower resolution camera is also less than one-third the resolution of the higher resolution camera. In some cases, the proportional relationship may be even less than one-third, such as perhaps ¼, ⅕, ⅙, ⅐, or even ⅛.

Figure 8:
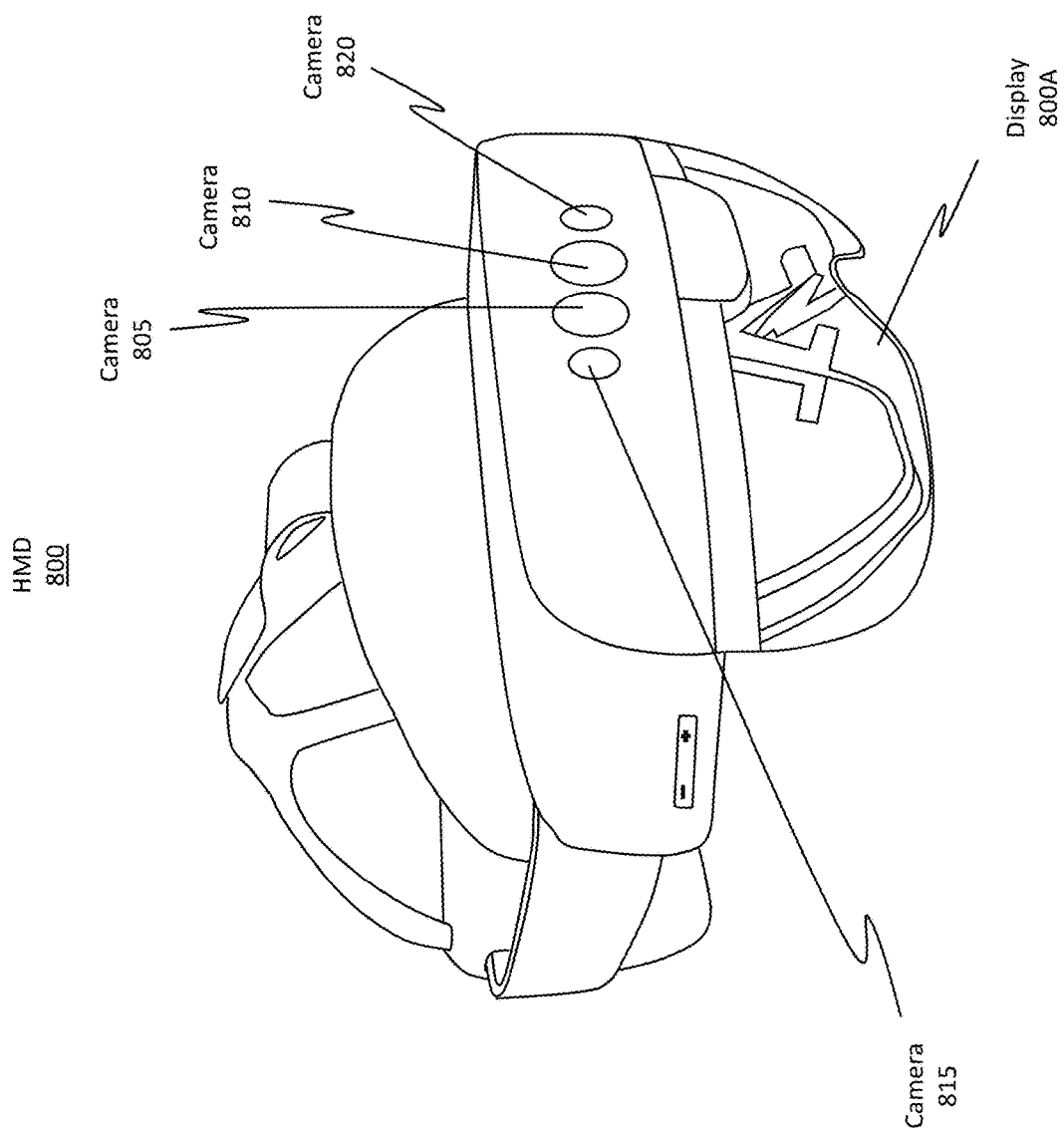
FIG. 8 illustrates another example configuration of the HMD.

FIG. 8 shows an HMD 800 and a corresponding display 800A, which are representative of the HMDs and displays discussed thus far. HMD 800 includes a first higher resolution camera 805, a second higher resolution camera 810, a first lower resolution camera 815, and a second lower resolution camera 820. The second higher resolution camera 810 is disposed proximate to the first higher resolution camera 805 on the HMD 800.

Figure 9:
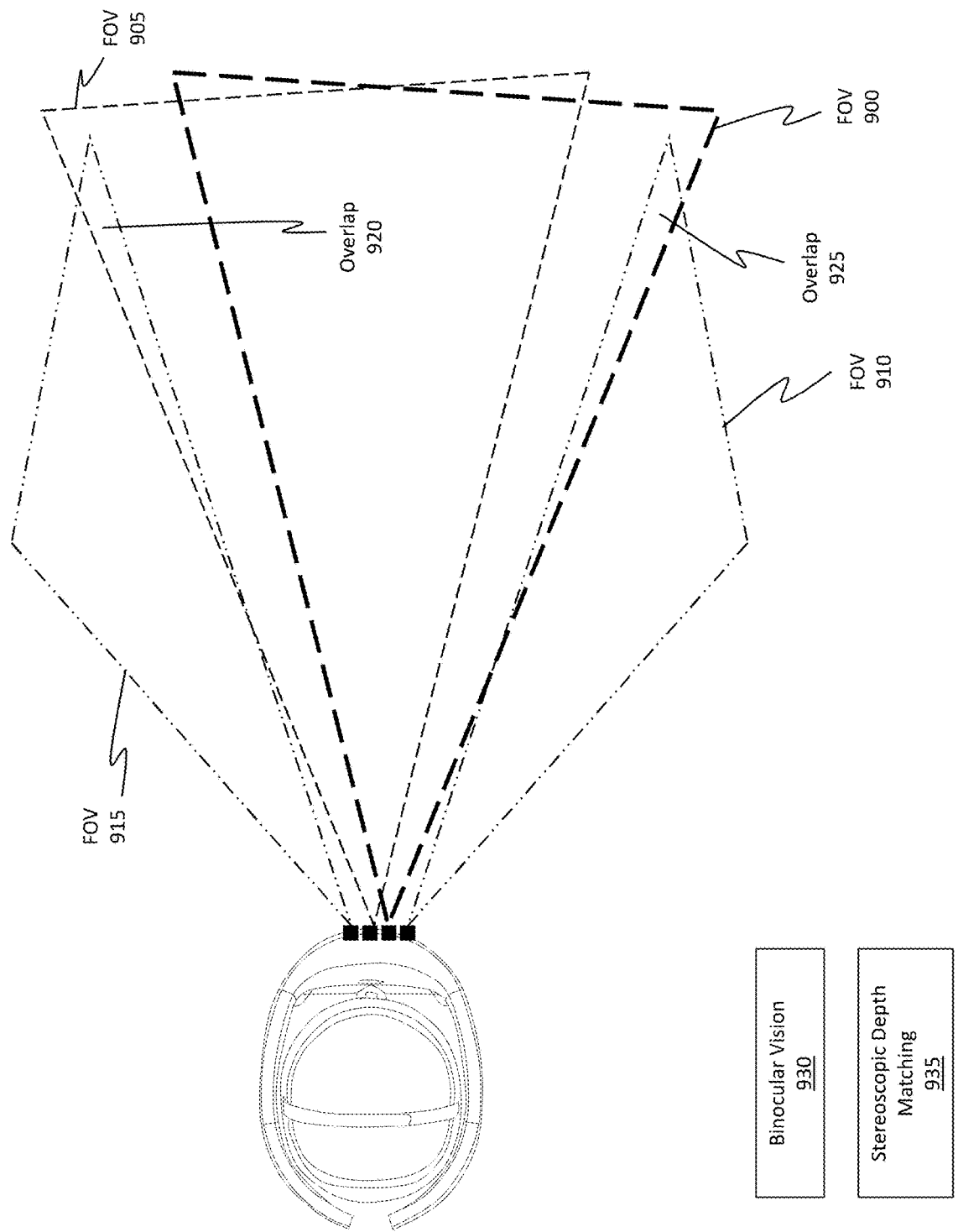
FIG. 9 illustrates the FOVs of this other structural configuration.

FIG. 9 shows the FOV 900 of the first higher resolution camera 805, the FOV 905 of the second higher resolution camera 810, the FOV 910 of the first lower resolution camera 815, and the FOV 915 of the second lower resolution camera 820. Notice, a majority of the FOV 905 of the second higher resolution camera overlaps the FOV 900 of the first higher resolution camera. By "majority," it is meant that at least 51% of the FOV 905 overlaps with the FOV 900. Of course, the overlap may be more than 51%, such as perhaps 60%, 70%, 80%, 90%, 95%, or even 100%.

Furthermore, the FOV 915 of the second lower resolution camera minimally overlaps (as shown by overlap 920 and in accordance with the principles discussed earlier) only the FOV 905 but not the FOV 900. Similarly, the FOV 910 of the first lower resolution camera minimally overlaps (as shown by overlap 925 and in accordance with the principles discussed earlier) only the FOV 900 but not the FOV 905.

A combination of the FOV 900 for the first higher first resolution camera and the FOV 905 of the second higher resolution camera provides binocular vision 930 to perform stereoscopic depth matching 935. Binocular vision or binocular disparity refers to a scenario in which two cameras capture the same content, thereby resulting in a condition where the generated images can be used to measure pixel disparity for pixels representing the same object, which is the process used to perform stereoscopic depth matching to compute depth. Accordingly, the configuration presented in FIG. 9 may also be used to generate merged images.

Figure 10:
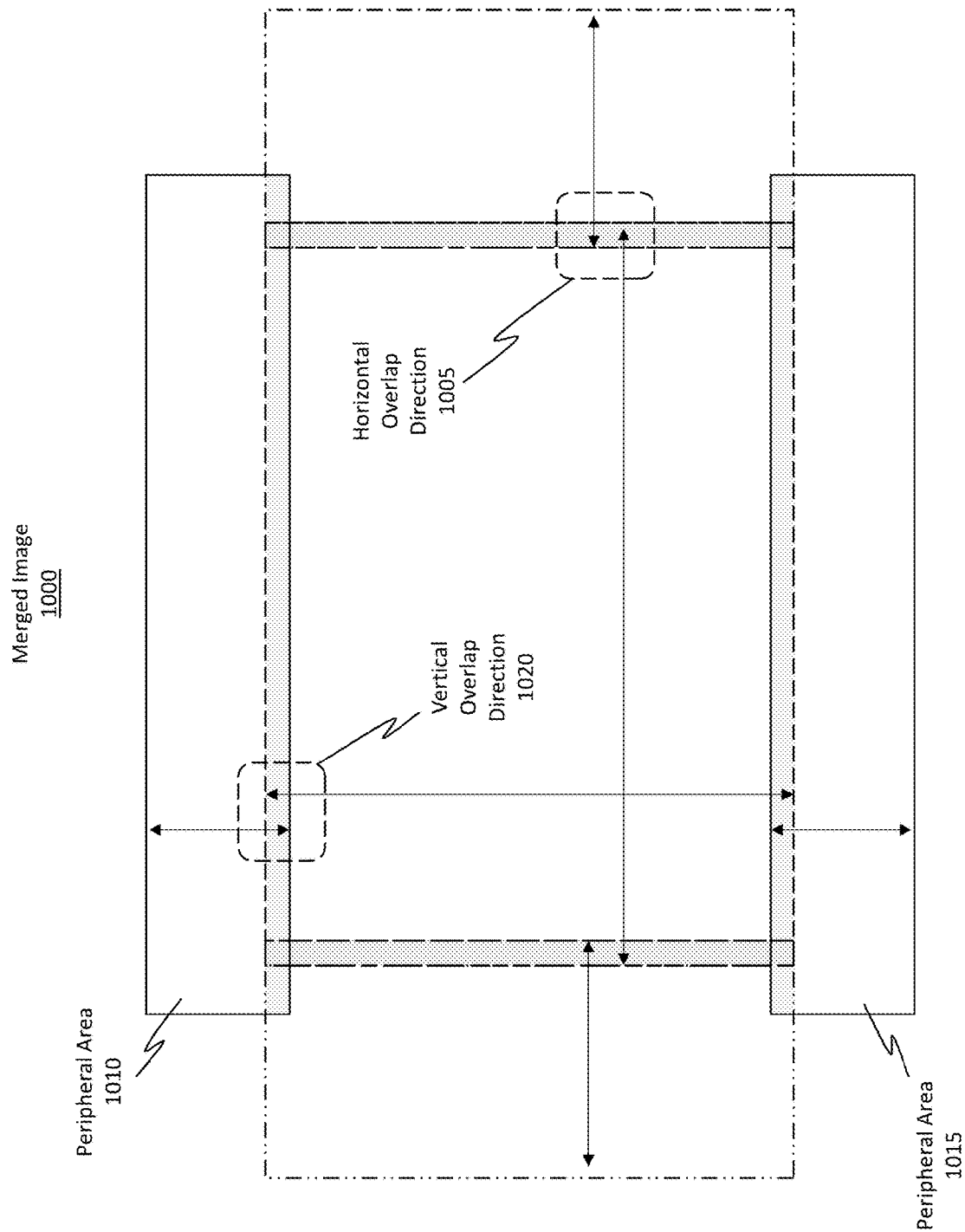
FIG. 10 illustrates how images can be merged in different ways, including in a horizontal overlap direction and in a vertical overlap direction.

FIG. 10 shows an example of a merged image 1000. Here, different image segments have been merged in a horizontal overlap direction 1005, as was described earlier in connection with FIGS. 7A, 7B, and 7C. In additional to peripheral areas being on the left and right horizontal sides of the central area of the display, the display may also include peripheral areas on the top and bottom vertical sides of the central area, as shown by peripheral area 1010 and peripheral area 1015. That is, the HMDs can have cameras tilted slightly upward and slightly downward (relative to the optical axis of the higher resolution camera) to provide image content in the peripheral areas 1010 and 1015. Similar to the horizontal overlap, the FOVs may also minimally overlap in a vertical overlap direction 1020, thereby producing image content in the merged image 1000 at the peripheral areas 1010 and 1015.

Figure 11:
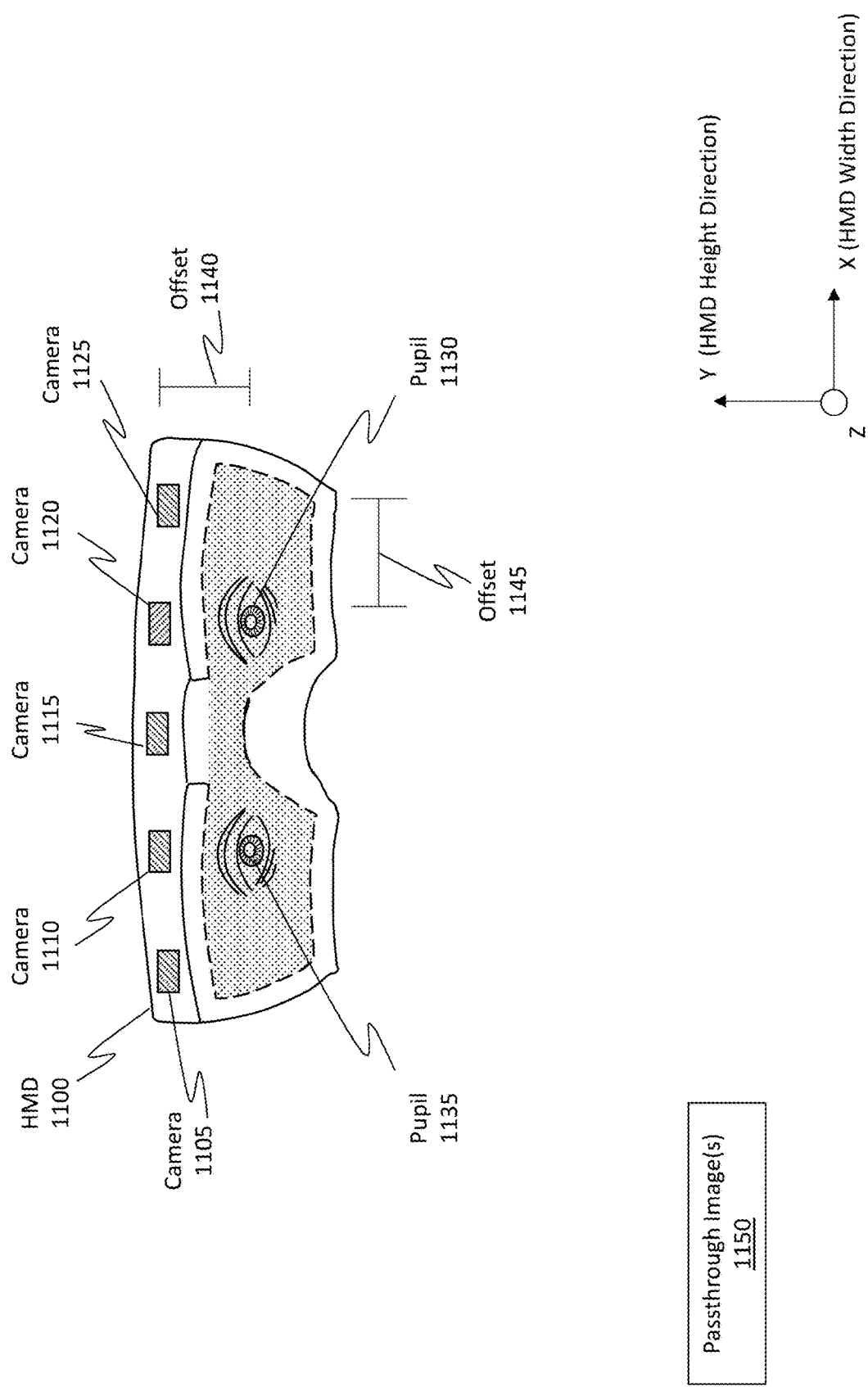
FIG. 11 illustrates how different cameras can be disposed on the HMD

FIG. 11 illustrates an example HMD 1100, which is representative of the HMDs discussed thus far. HMD 1100 is shown as including multiple different cameras, including cameras 1105, 1110, 1115, 1120, and 1125. Cameras 1105-1125 are representative of any number or combination of the visible light camera(s) 410, the low light camera(s) 415, the thermal imaging camera(s) 420, and the UV camera(s) 425, or the infrared camera 435 from FIG. 4. While only 5 cameras are illustrated in FIG. 11, HMD 1100 may include more or less than 5 cameras. The cameras 1105-1125 can also represent the higher and lower resolution cameras.

Notice, the principle points of the cameras are all located at different locations. A "principle point" of a camera is a point where the camera's perspective center is projected on an image plane. These differences in principle points leads to the parallax condition, as will be discussed later. The differences in the principle points (resulting in parallax) also presents difficulties in terms of stitching images together to form a single merged image. Various levels of parallax correction will be discussed later.

Accordingly, the cameras can be located at specific positions on the HMD 1100. In some cases, a first camera (e.g., perhaps camera 1120) is disposed on the HMD 1100 at a position above a designated left eye position of a user who wears the HMD 1100 relative to a height direction of the HMD. For example, the camera 1120 is positioned above the pupil 1130. As another example, the first camera (e.g., camera 1120) is additionally positioned above the designated left eye position relative to a width direction of the HMD. That is, the camera 1120 is positioned not only above the pupil 1130 but also in-line relative to the pupil 1130. When a VR system is used, a camera may be placed directly in front of the designated left eye position. With reference to FIG. 11, a camera may be physically disposed on the HMD 1100 at a position in front of the pupil 1130 in the z-axis direction.

When a second camera is provided (e.g., perhaps camera 1110), the second camera may be disposed on the HMD 1100 at a position above a designated right eye position of a user who wears the HMD relative to the height direction of the HMD. For example, the camera 1110 is above the pupil 1135. In some cases, the second camera is additionally positioned above the designated right eye position relative to the width direction of the HMD. When a VR system is used, a camera may be placed directly in front of the designated right eye position. With reference to FIG. 11, a camera may be physically disposed on the HMD 1100 at a position in front of the pupil 1135 in the z-axis direction.

When a user wears HMD 1100, HMD 1100 fits over the user's head and the HMD 1100's display is positioned in front of the user's pupils, such as pupil 1130 and pupil 1135. Often, the cameras 1105-1125 will be physically offset some distance from the user's pupils 1130 and 1135. For instance, there may be a vertical offset in the HMD height direction (i.e. the "Y" axis), as shown by offset 1140. Similarly, there may be a horizontal offset in the HMD width direction (i.e. the "X" axis), as shown by offset 1145.

HMD 1100 is configured to provide passthrough image(s) 1150 (i.e. the disclosed "merged images") for the user of HMD 1100 to view. In doing so, HMD 1100 is able to provide a visualization of the real world without requiring the user to remove or reposition HMD 1100. These passthrough image(s) 1150 effectively represent the view of the environment from the HMD's perspective. Cameras 1105-1125 are used to provide these passthrough image(s) 1150. The offset (e.g., offset 1140 and 1145) between the cameras and the user's pupils results in parallax. In order to provide these passthrough image(s) 1150, the embodiments can perform parallax correction by applying various transformations and reprojections on the images in order to change the initial perspective represented by an image into a perspective matches that of the user's pupils. Parallax correction can rely on the use of a depth map in order to make the reprojections.

In some implementations, as will be discussed later, the embodiments utilize a planar reprojection process to correct parallax when generating the passthrough images as opposed to performing a full three-dimensional reprojection. Using this planar reprojection process is acceptable when objects in the environment are sufficiently far away from the HMD. Thus, in some cases, the embodiments are able to refrain from performing three-dimensional parallax correction because the objects in the environment are sufficiently far away and because that distance results in a negligible error with regard to depth visualizations or parallax issues. In some embodiments, a motion model is used to correct parallax. As discussed, any of the cameras 1105-1125 can be any of the higher resolution cameras or the lower resolution cameras mentioned earlier. Accordingly, the higher resolution cameras and the lower resolution cameras can be positioned or disposed at various locations on the HMD 1100.

Methods for Merging Image Content Using Planar Reprojection

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
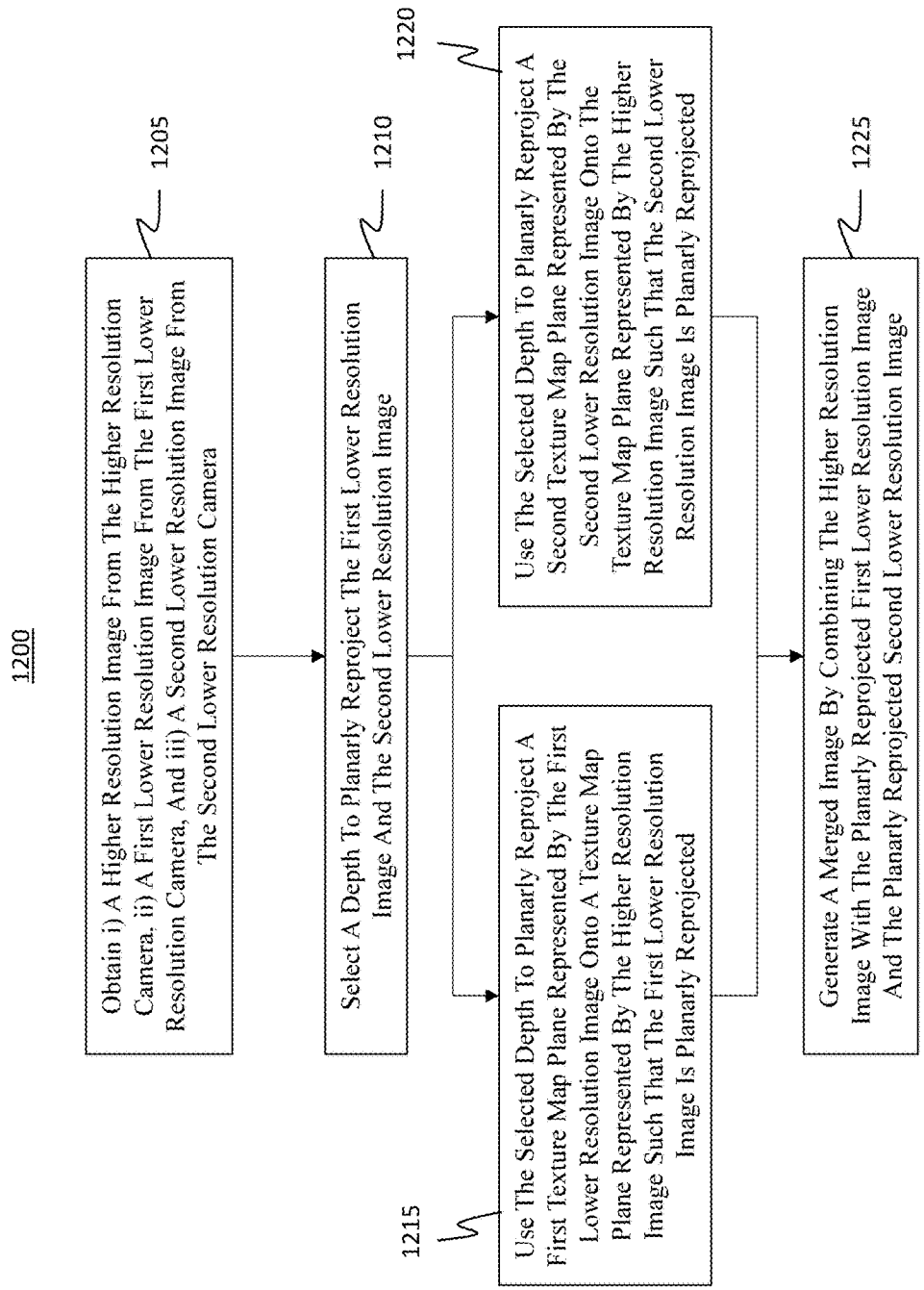
FIG. 12 illustrates an example method for using planar reprojection to generate a merged image.

FIG. 12 illustrates a flowchart of an example method 1200 for merging lower resolution image content with higher resolution image content within a merged image. Method 1200 is performed by the HMDs discussed thus far (e.g., HMD 600 of FIG. 6). For example, the HMDs that perform method 1200 include a higher resolution camera (e.g., higher resolution camera 605), a first lower resolution camera (e.g., first lower resolution camera 610) disposed on the HMD at a first side position of the higher resolution camera, and a second lower resolution camera (e.g., second lower resolution camera 615) disposed on the HMD at a second side position of the higher resolution camera.

Figure 13:
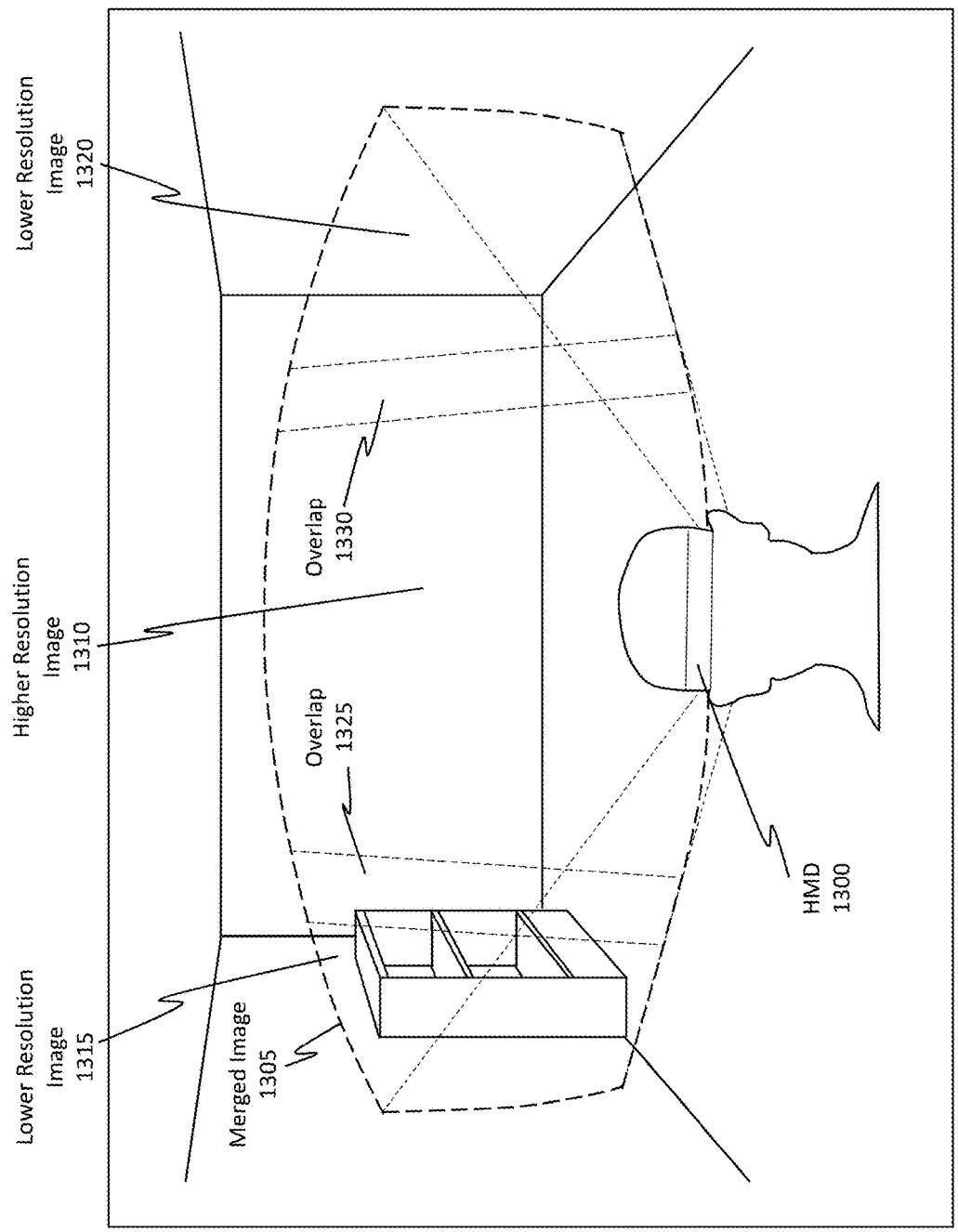
FIG. 13 illustrates an example merged image.

Initially, method 1200 includes an act (act 1205) of obtaining i) a higher resolution image (e.g., higher resolution image 620 from FIG. 6) from the higher resolution camera, ii) a first lower resolution image (e.g., lower resolution image 625) from the first lower resolution camera, and iii) a second lower resolution image (e.g., lower resolution image 625) from the second lower resolution camera. FIG. 13 provides additional information regarding method act 1205.

FIG. 13 shows a HMD 1300 displaying a merged image 1305, which will be generated by following the operations outlined in method 1200. Here, the merged image 1305 includes or is formed from a higher resolution image 1310, a lower resolution image 1315, and a lower resolution image 1320, as has been discussed in the earlier figures. There is an overlap 1325 (e.g., a minimal overlap) between the lower resolution image 1315 and the higher resolution image 1310, and an overlap 1330 (e.g., a minimal overlap) between the lower resolution image 1320 and the higher resolution image 1310.

Figure 14:
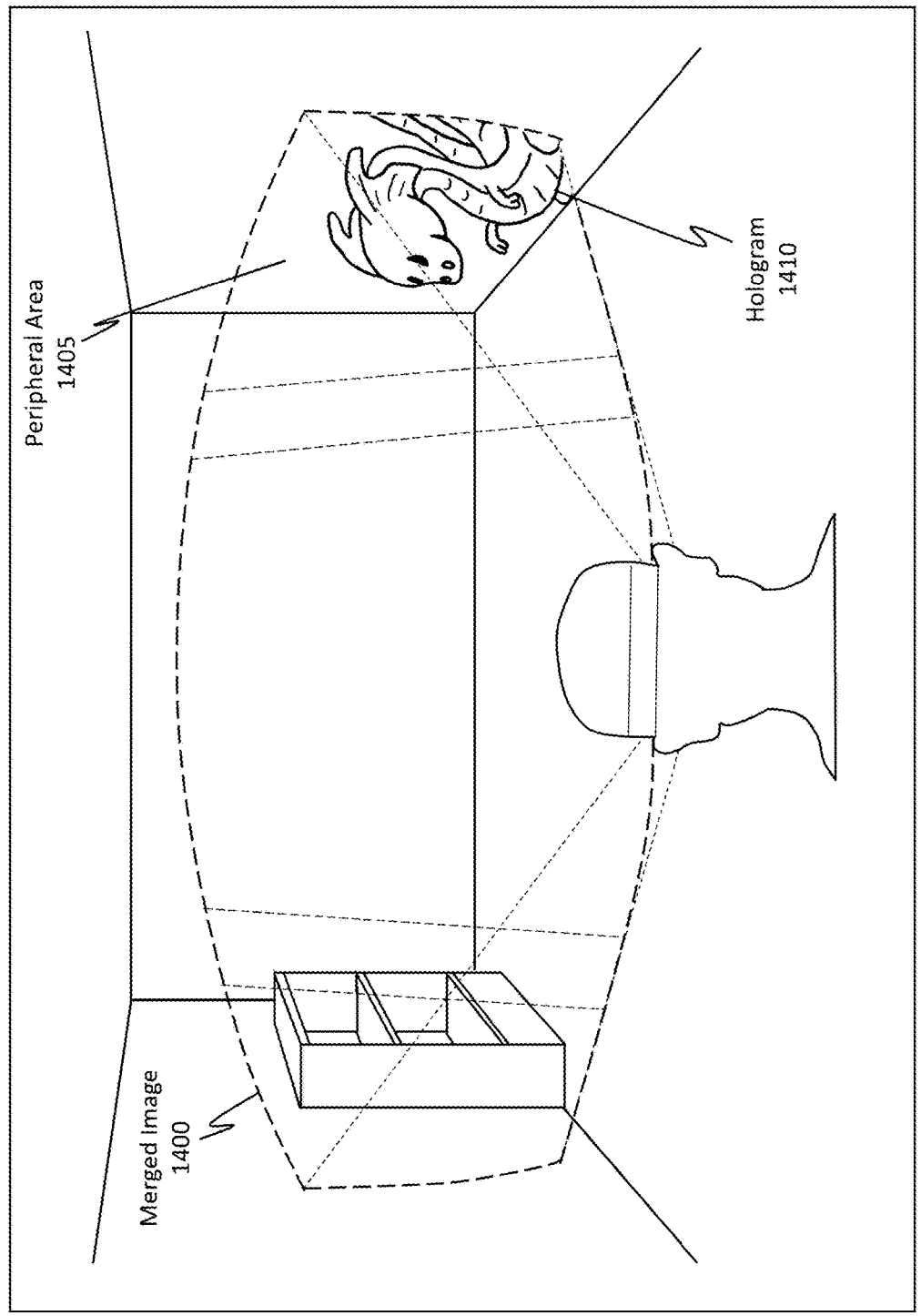
FIG. 14 illustrates another example of a merged image.

FIG. 14 shows a merged image 1400 that includes a peripheral area 1405, which corresponds to the lower resolution image 1320 of FIG. 13. Here, a hologram 1410 is being displayed in the peripheral area 1405. It is desirable to ensure that the merged image 1400 provides a pleasant viewing experience for the user.

Returning to FIG. 12, method 1200 includes an act (act 1210) of selecting a depth to planarly reproject the first lower resolution image and the second lower resolution image. Because the image content in the peripheral areas of the merged image are at a lower resolution and because they are at the extremities of the merged image, it is often beneficial to perform a planar reprojection on this image content as opposed to performing a full 6 or 3 degree of freedom (DOF) reprojection operation. The selected depth may be any depth, such as perhaps 1 meter away from the HMD, 2 m, 3 m, 4 m, 5 m, 6 m, 7 m, 8 m, 9 m, 10 m, or more than 10 m. The planar reprojection process causes the entire image (e.g., the lower resolution images) to be reprojected to a point corresponding to the selected depth. The selected depth for the first lower resolution image may be the same as the selected depth for the second lower resolution image. Alternatively, the selected depths may be different (e.g., 5 meters for the first lower resolution image and 7 meters for the second lower resolution image, where the difference may be due to the HMD's pose or orientation).

Optionally, the selected depth may be based on a depth identified within the area of overlap between the higher resolution image and one of the lower resolution images. For example, the selected depth may be the depth of a center pixel that exists in the area of overlap. Alternatively, a default depth (e.g., 5 m) can be used irrespective of the depth of the center pixel. The selected depth can be an arbitrary depth because the content in the peripheral area of the display is provided primarily for situational awareness (such as movement detection) such that preserving the accurate geometries for those peripheral items is less relevant. If desired, the user can shift his/her head position to then bring the fringe elements into view within the central area of the display.

Alternatively, the embodiments can estimate a depth at which the image is to be reprojected and then planarly reproject to that estimated depth. The estimation may be based on the average depth of a group of pixels that are estimated to be at the same depth as the periphery content.

Figure 15:
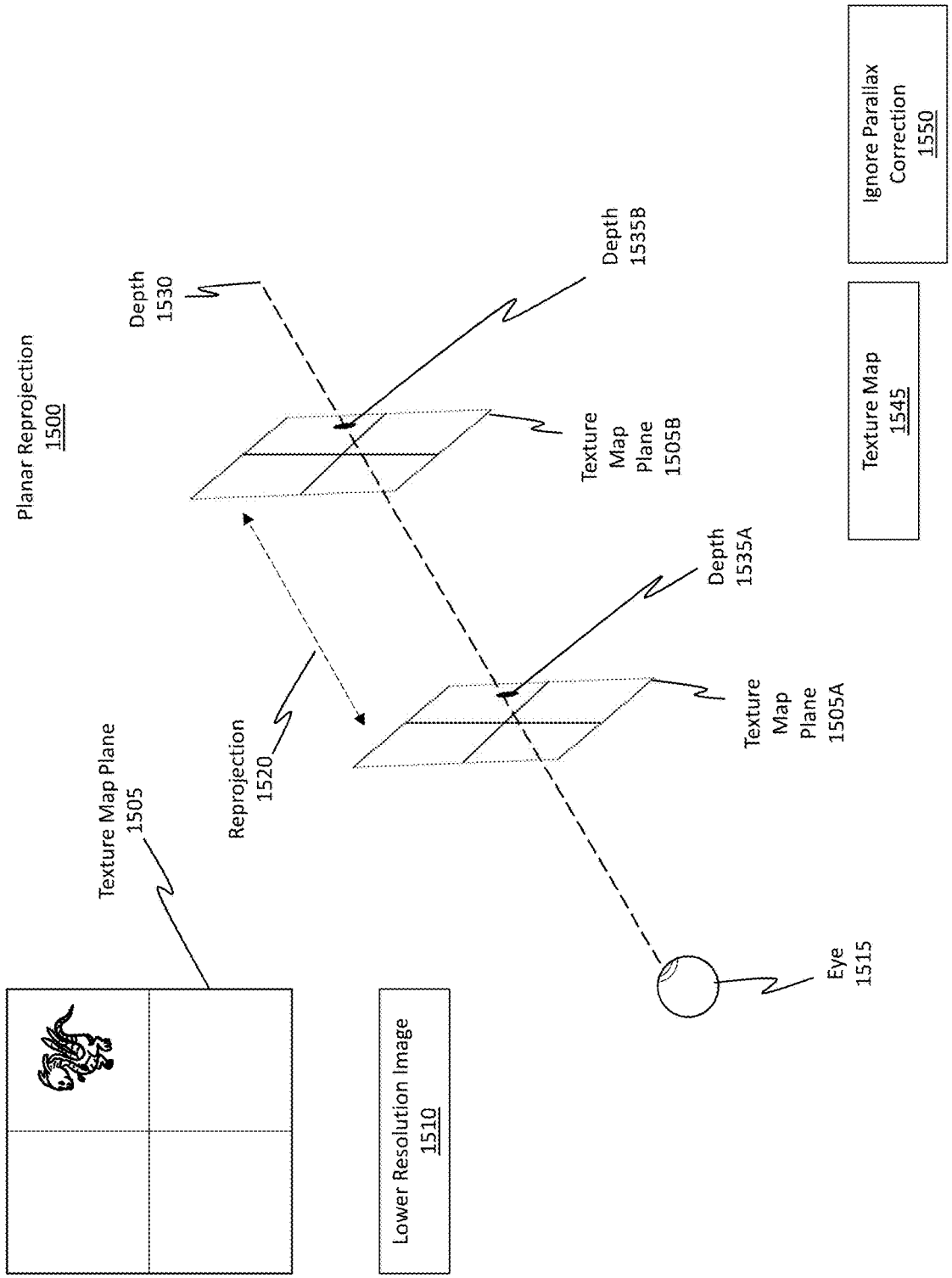
FIG. 15 illustrates an example planar reprojection process.

Returning to FIG. 12, method 1200 then includes an act (act 1215) of using the selected depth to planarly reproject a first texture map plane represented by the first lower resolution image onto a texture map plane represented by the higher resolution image. As a consequence, the first lower resolution image is planarly reprojected. In parallel with act 1215, method 1200 includes an act (act 1220) of using the selected depth to planarly reproject a second texture map plane represented by the second lower resolution image onto the texture map plane represented by the higher resolution image. As a consequence, the second lower resolution image is also planarly reprojected. Recall, the reprojection depths may be the same or they may be different. FIG. 15 provides an overview of the planar reprojection process.

FIG. 15 shows a planar reprojection 1500 operation involving a texture map plane 1505 of a low resolution image 1510. As used herein, a "texture map" refers to an image that is mapped or applied to a surface of an object or shape. A texture map having two dimensions is referred to as a "texture map plane." A texture map may be a bitmap image or even a procedural texture and may include red, green, blue (RGB) color data. The texture map (including the texture map plane 1505) is acquired by lower resolution cameras generating the lower resolution image 1510.

FIG. 15 shows an eye 1515 of a user. The planar reprojection 1500 process involves reprojecting (as shown by reprojection 1520) the texture map plane 1505A to different depths along a depth 1530 line. For instance, the texture map plane 1505A is shown as being reprojected to the depth 1535A (i.e. the perceived distance from the user's eye 1515) while the texture map plane 1505B is shown as being reprojected to the depth 1535B. The entire image content (e.g., such as the hologram 1410 from FIG. 14) is reprojected in a planar fashion such that all the image content shares the same perceived depth values.

Accordingly, a texture map 1545 may have different dimensions (e.g., 1-3 dimensions), and a texture map plane is a texture map having two dimensions. By performing the planar reprojection 1500 process, the embodiments are effectively able to ignore the effects of parallax that occur when the cameras on the HMD have different principle points or perspectives than the principles points or perspectives of the user's eyes. In other words, parallax occurs as a result of the offsets 1140 and 1145 mentioned in FIG. 11. By performing the planar reprojection 1500 process, the embodiments can ignore parallax correction 1550 because the reprojected depth 1530 is sufficiently far away from the user's eye 1515 such that the impact of parallax is nominal and can be ignored. The reprojected depth 1530 can be set to any value. Example depths include, but are not limited to, 1 meter, 2 m, 3 m, 4 m, 5 m, 6 m, 7 m, 8 m, 9 m, 10 m, 20 m, or more than 20 m away from the user's eye 1515 and away from the HMD Returning to FIG. 12, method 1200 includes an act (act 1225) of generating a merged image by combining the higher resolution image with the planarly reprojected first lower resolution image and the planarly reprojected second lower resolution image. For example, FIG. 14 shows the resulting merged image 1400 that is formed from the combination of the higher resolution image and the two lower resolution images.

The process of merging, stitching, or otherwise fusing multiple images together goes beyond just combining image content to generate a single composite image. In some embodiments, generating the merged image includes performing tone mapping on a first overlapping region in which a portion of the planarly reprojected first lower resolution image overlaps the higher resolution image and further includes performing tone mapping on a second overlapping region in which a portion of the planarly reprojected second lower resolution image overlaps the higher resolution image.

Many displays have a limited bit depth, such as perhaps 8 bits of dynamic range. In contrast, the camera sensors can have 12 or even 14 bits of dynamic range. The process of "tone mapping" effectively maps one set of colors to another set of colors in order to mimic or approximate the appearance of a high dynamic range image. As an example, the embodiments can take the brightest objects and push their color content down so as to avoid saturating the upper end of the display. The embodiments can take some of the darker objects and bring their color content up in brightness to provide an overall balanced image. In this regard, tone mapping is a technique for balancing the image content.

Figure 16:
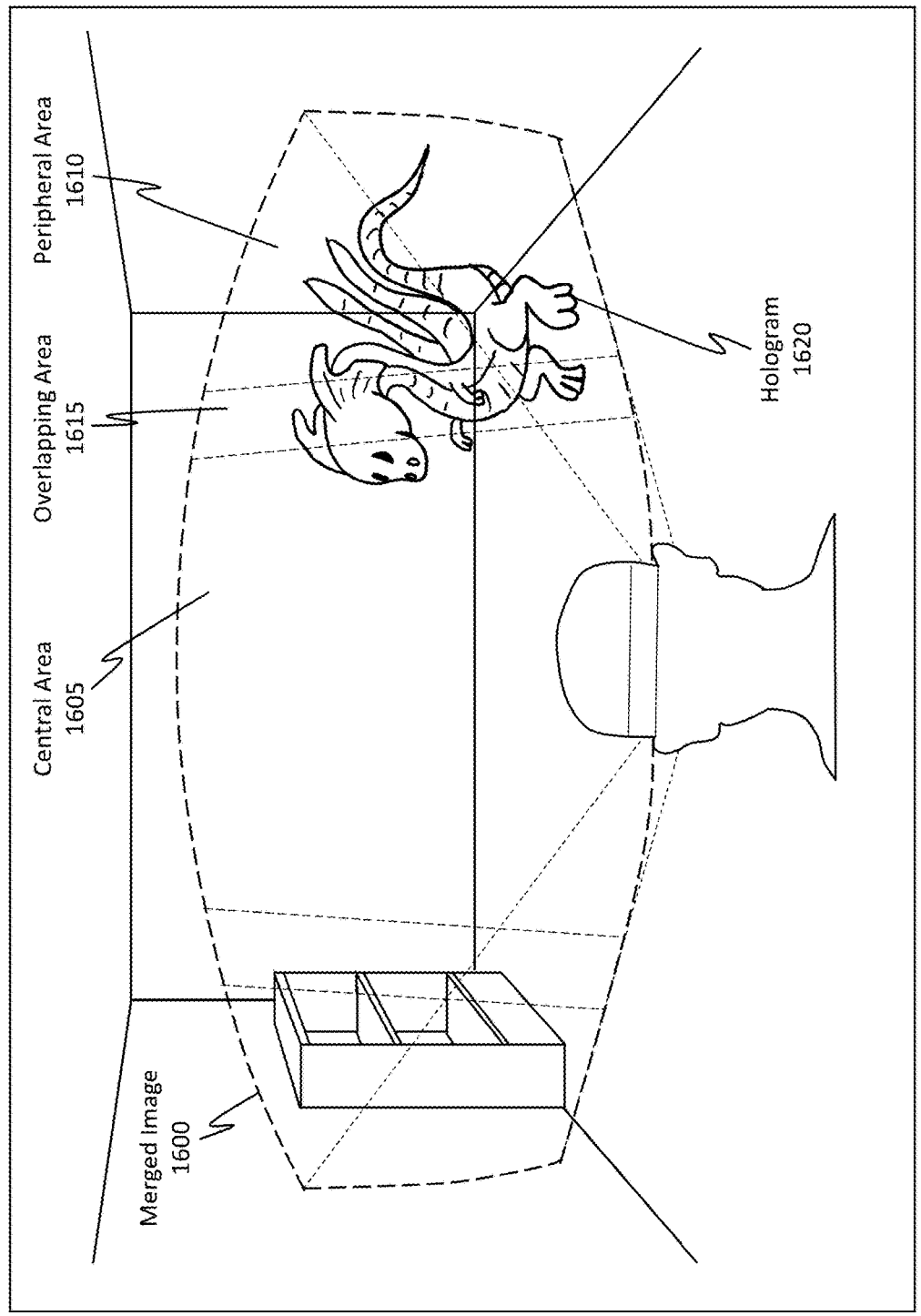
FIG. 16 illustrates another example of a merged image.
Figure 17:
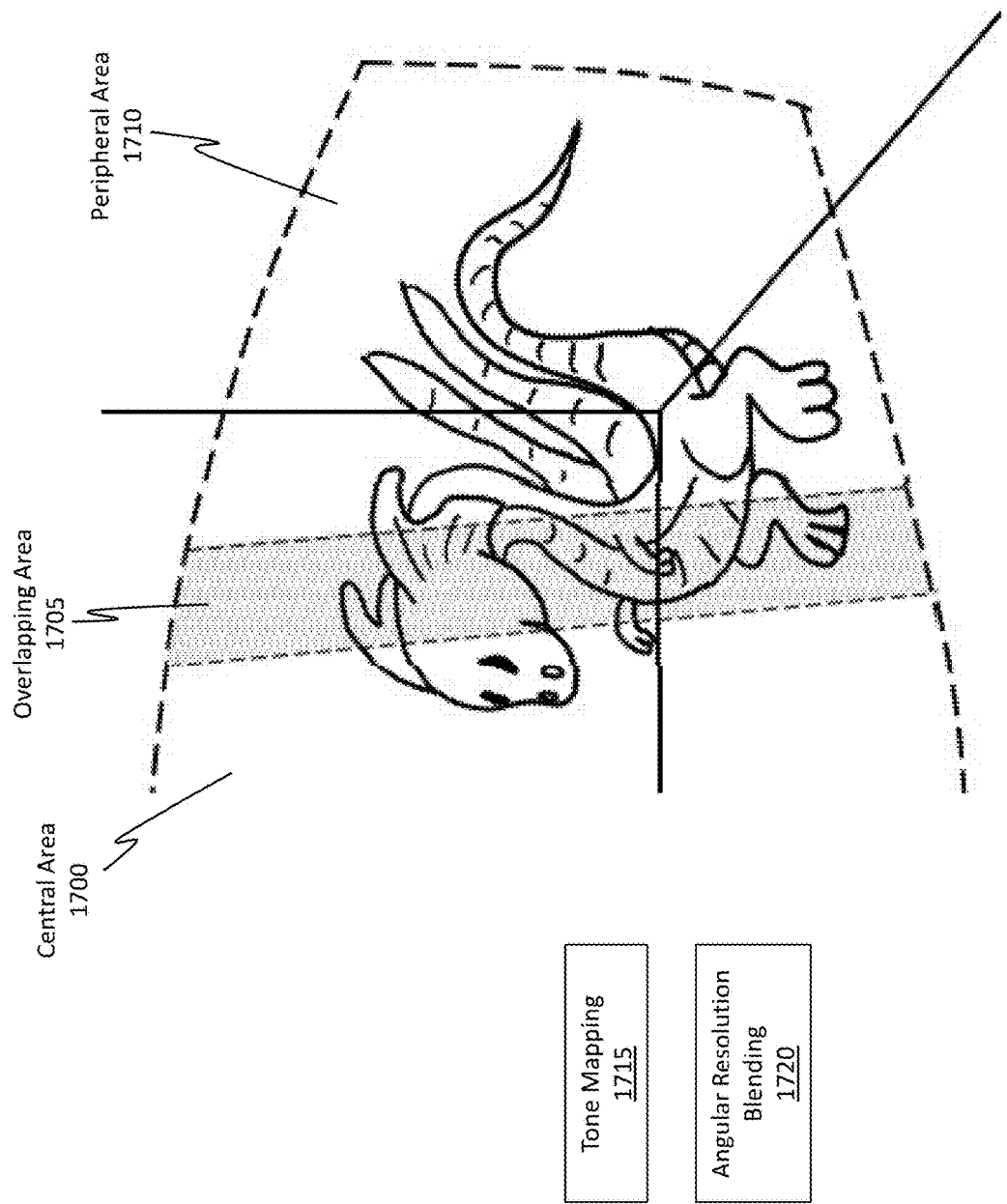
FIG. 17 illustrates a technique for feathering or tapering pixel resolution to progressively transition from higher resolution image content to lower resolution image content.
Figure 18:
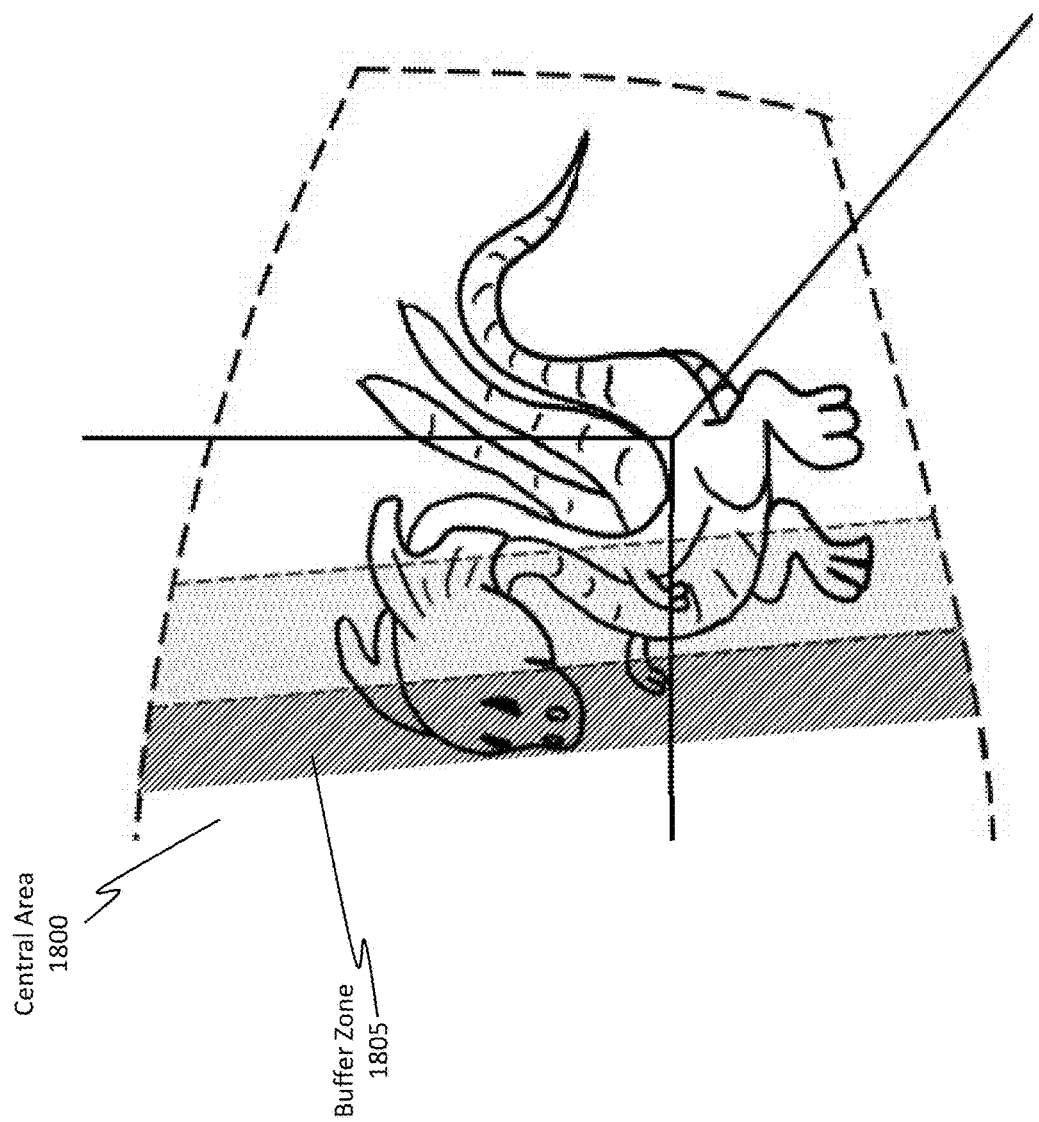
FIG. 18 illustrates an example buffer region that may be used to facilitate the tapering.

Optionally, the process of generating the merged image includes performing a first resolution blend on the first overlapping region to blend a resolution of the higher resolution image with a first resolution of the planarly reprojected first lower resolution image and performing a second resolution blend on the second overlapping region to blend the resolution of the higher resolution image with a second resolution of the planarly reprojected second lower resolution image. FIGS. 16, 17, and 18 provide additional details regarding these additional, optional operations.

FIG. 16 shows a merged image 1600 which may be generated by following the processes outlined in method 1200 of FIG. 12. The merged image 1600 includes content displayed within a central area 1605 and content displayed within a peripheral area 1610. The overlapping area 1615 represents an overlap between the FOV of the higher resolution camera and one of the lower resolution camera such that both of those cameras generate image content that is displayable within the overlapping area 1615. FIG. 16 also shows how a hologram 1620 can be displayed across the three regions, namely: the central area 1605, the overlapping area 1615, and the peripheral area 1610.

The process of merging the planarly reprojected first lower resolution image with the higher resolution image (and even with the second lower resolution image) results in the merged image having an increased horizontal field of view (FOV) as compared to a horizontal FOV of the higher resolution image. This merging process also provides a merged image that generally follows a human's foveal vision acuity.

FIG. 17 shows a blown-up version of the merged image 1600 from FIG. 16. Specifically, FIG. 17 shows a central area 1700, an overlapping area 1705, and a peripheral area 1710. In accordance with the disclosed principles, the embodiments are able to perform a tone mapping 1715 operation and/or an angular resolution blending 1720 operation at least on the pixels included within the overlapping area 1705. Such operations are performed in order to progressively blend the merged image in a manner so as to improve the visual display of the merged image. For instance, instead of jumping or dramatically shifting from displaying higher resolution image content in the central area 1700 to displaying lower resolution image content in the peripheral area 1710, the embodiments are able to progressively blend the resolutions across the region of the overlapping area 1705, thereby making a progressive transition from higher resolution content to lower resolution content.

Because the overlapping area 1705 is usually quite small (e.g., the level of overlap is less than 10 degrees), some embodiments provide a buffer zone in order to further increase the area where the blending and tone mapping can occur. Such a blending zone is shown in FIG. 18.

FIG. 18 shows a central area 1800 that includes higher resolution image content. FIG. 18 also shows how a buffer zone 1805 can be created within the central area 1800 and can be used to effectively extend the area that is to be blended (e.g., tone mapped and angular resolution blending). The buffer zone 1805 can be based on a certain number of pixels or based on a certain horizontal FOV degree. For instance, the buffer zone 1805 can extend inwards within the central area 1800 by 1, 2, 3, 4, 5, 6, 7, 8, 9, 10, 20, 30, 40, 50, 60, 70 80, 90, 100, 200, 300, 400, or more than 400 pixels.

Alternatively, the buffer zone 1805 can be a 1 degree sweep inwards within the central area 1800, a 2 degree sweep, 3 degrees, 4, 5, 6, 7, 8, 9, 10, 20, or more than 20 degree sweep inwards. By providing the buffer zone, the embodiments can increase the area where blending occurs. The buffer zone 1805 is extracted or placed within the central area 1800 because down-sampling can occur within that area due to the higher resolution within the central area 1800. In contrast, the buffer zone 1805 is not placed within the peripheral area because those pixels cannot be adequately up-sampled to facilitate the blending operation.

Accordingly, as a result combining the higher resolution image with the planarly reprojected first lower resolution image and the planarly reprojected second lower resolution image, the merged image includes higher resolution image content within the central area of the merged image and lower resolution image content at the peripheral areas of the merged image. Optionally, the merged image includes a transition area where the pixel resolution progressively decreases from the higher resolution provided within the central area to the lower resolution provided within the peripheral areas. That transition area can at least be the overlapping area that results from the camera FOVs overlapping. Optionally, the transition area can be increased by incorporating a buffer zone that extends into the central area.

Methods for Merging Image Content Using a Motion Model

Figure 19:
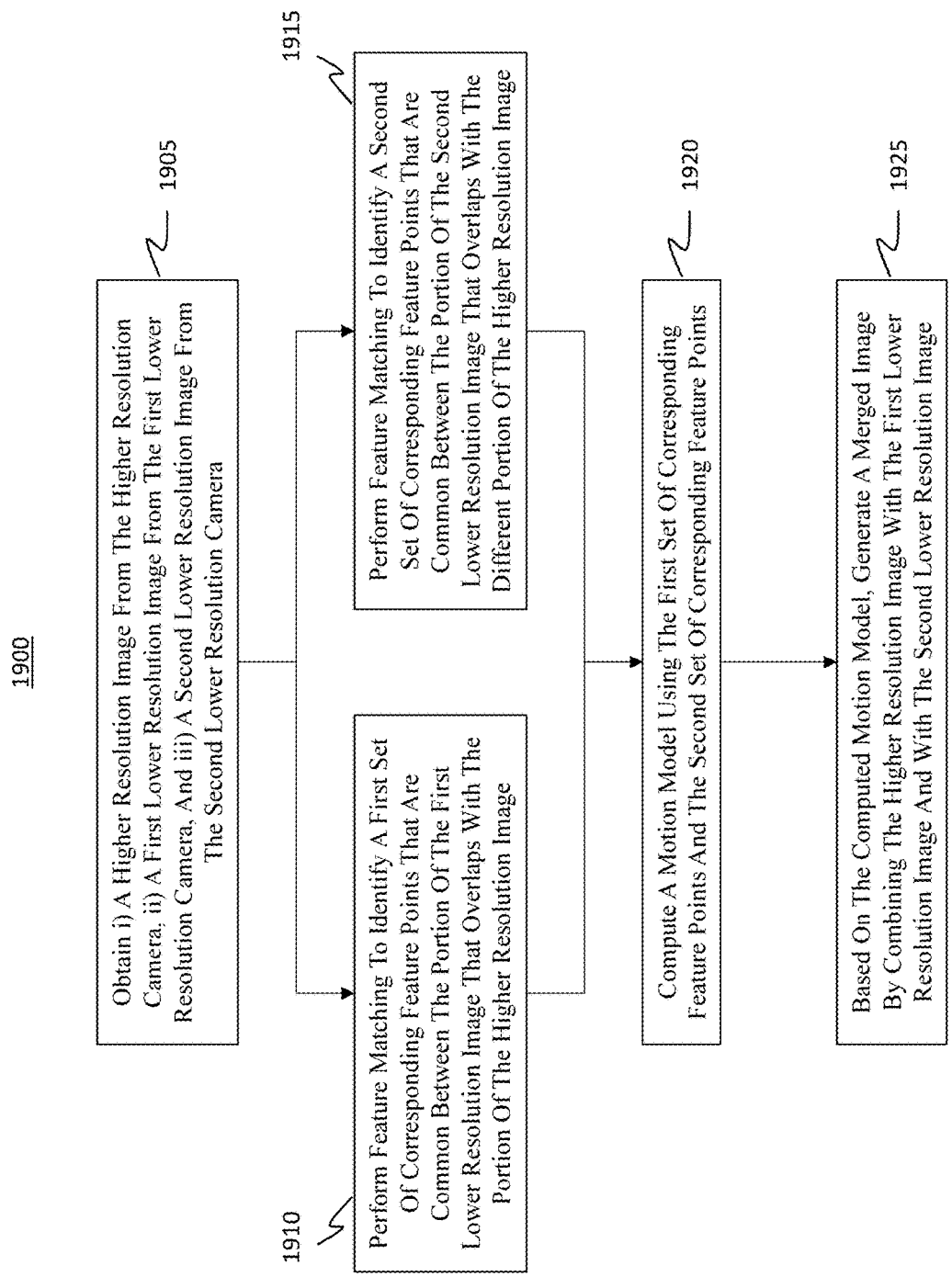
FIG. 19 illustrate an example method for using a motion model to merge images.

Whereas method 1200 of FIG. 12 was focused on the use of planar reprojection to generate a merged image, method 1900 of FIG. 19 is focused on the use of a motion model to generate a merged image. Specifically, FIG. 19 is focused on a method 1900 for merging lower resolution image content with higher resolution image content within a merged image. Similar to method 1200, method 1900 is performed by a HMD that includes a higher resolution camera, a first lower resolution camera disposed on the HMD at a first side position of the higher resolution camera, and a second lower resolution camera disposed on the HMD at a second side position of the higher resolution camera.

Method 1900 initially includes an act (act 1905) of obtaining i) a higher resolution image from the higher resolution camera, ii) a first lower resolution image from the first lower resolution camera, and iii) a second lower resolution image from the second lower resolution camera. As discussed earlier, a portion of the first lower resolution image overlaps with a portion of the higher resolution image, and a portion of the second lower resolution image overlaps with a different portion of the higher resolution image. Such attributes were discussed in detail with respect to the earlier figures.

Act 1910 then includes performing feature matching to identify a first set of corresponding feature points that are common between the portion of the first lower resolution image that overlaps with the portion of the higher resolution image. In parallel with act 1910, act 1915 includes performing feature matching to identify a second set of corresponding feature points that are common between the portion of the second lower resolution image that overlaps with the different portion of the higher resolution image. Because the cameras are calibrated, the orientations of the cameras are known. Based on the calibration of the cameras and based on the identified feature points, the embodiments can determine the geometry of the scene and then determine how to align the resulting images using a computed motion model. As used herein, the term "scene" refers to the observable area within an environment by a camera. Thus, an environment may include any number of "scenes," without limit.

Figure 21:
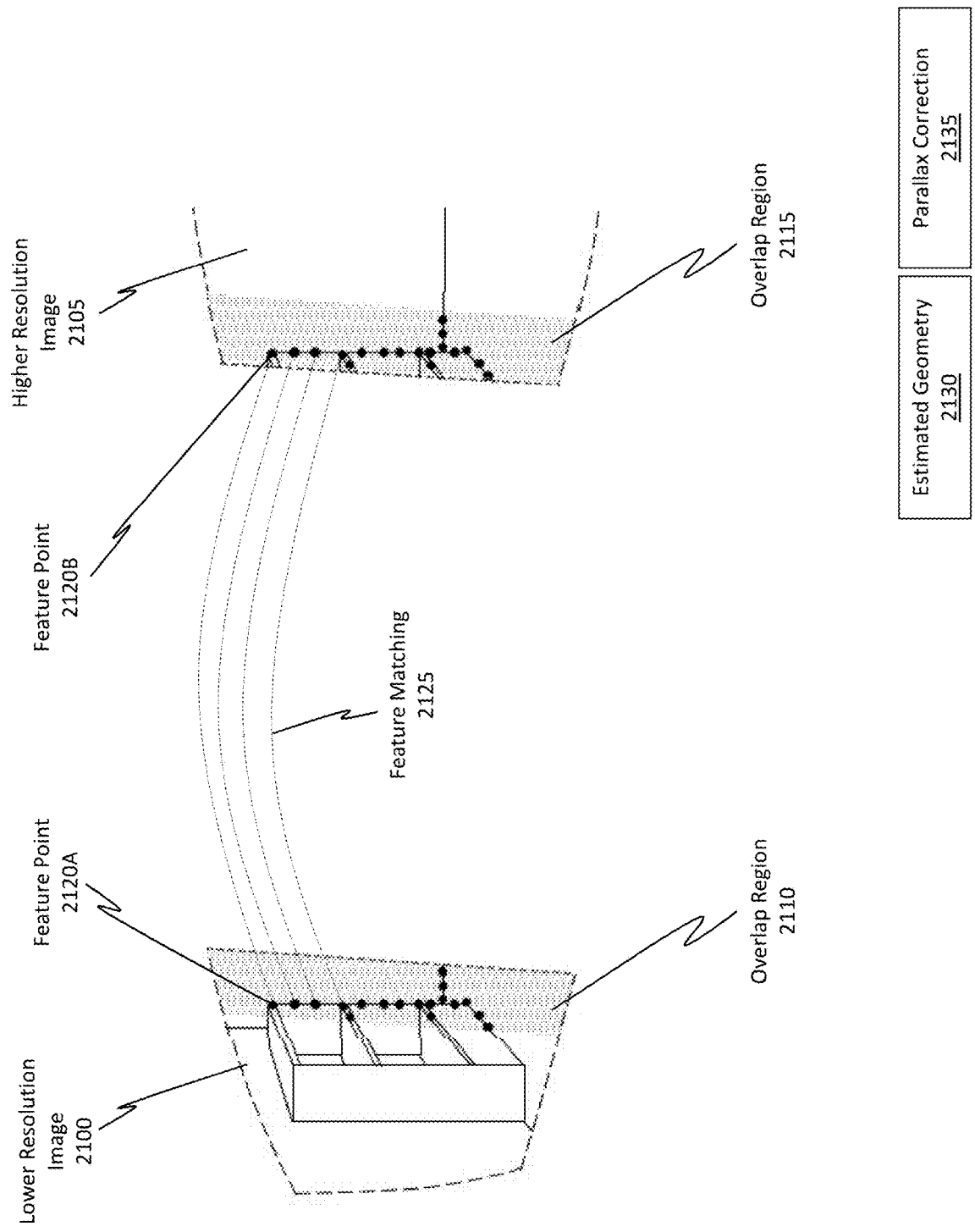
FIG. 21 shows a feature matching operation in which feature points from different images are matched together.
Figure 22:
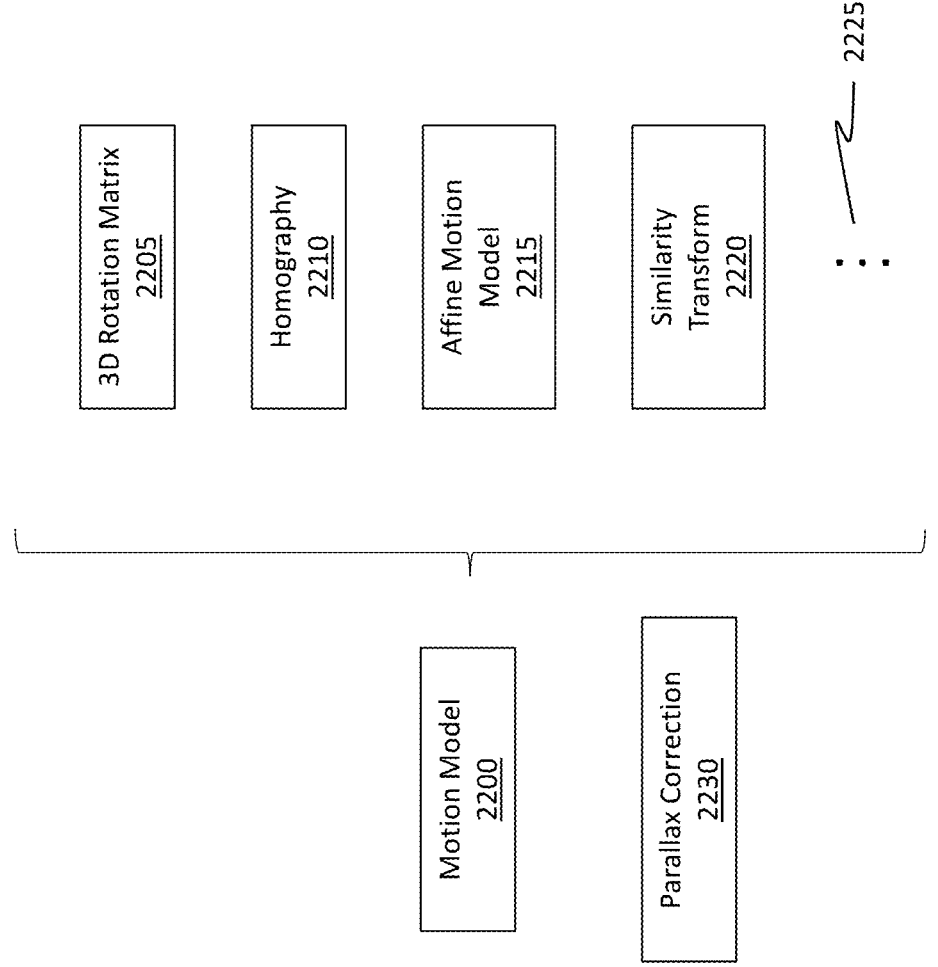
FIG. 22 illustrates different types of motion models that may be used to generate the merged image.
Figure 23:
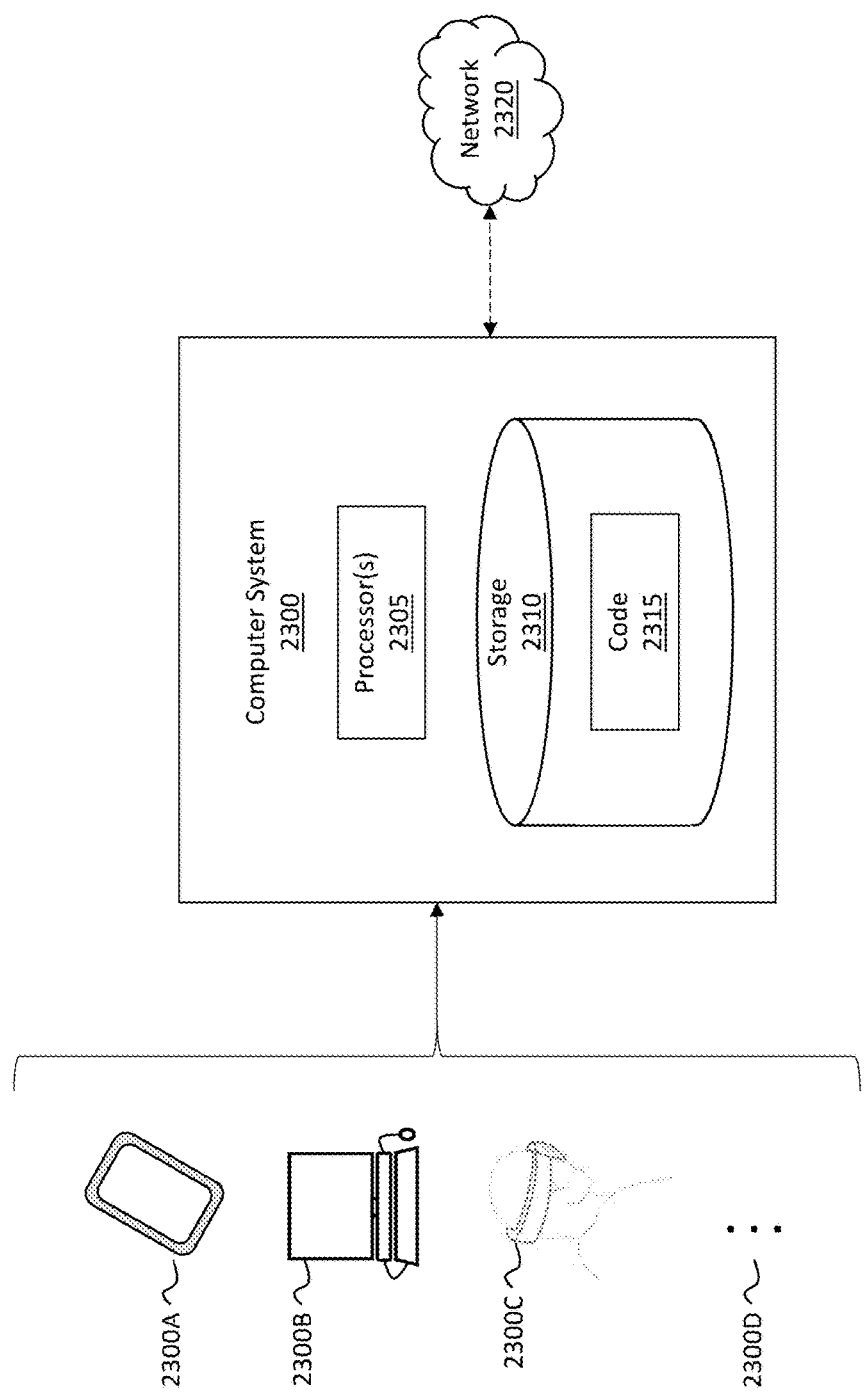
FIG. 23 illustrates an example computer system that is configured to perform any of the disclosed operations.

A motion model is computed in act 1920 using the first set of corresponding feature points and the second set of corresponding feature points. Then, based on the computed motion model, act 1925 includes generating a merged image by combining the higher resolution image with the first lower resolution image and with the second lower resolution image. FIGS. 21, 22, and 23 provide additional details regarding these method acts.

Figure 20:
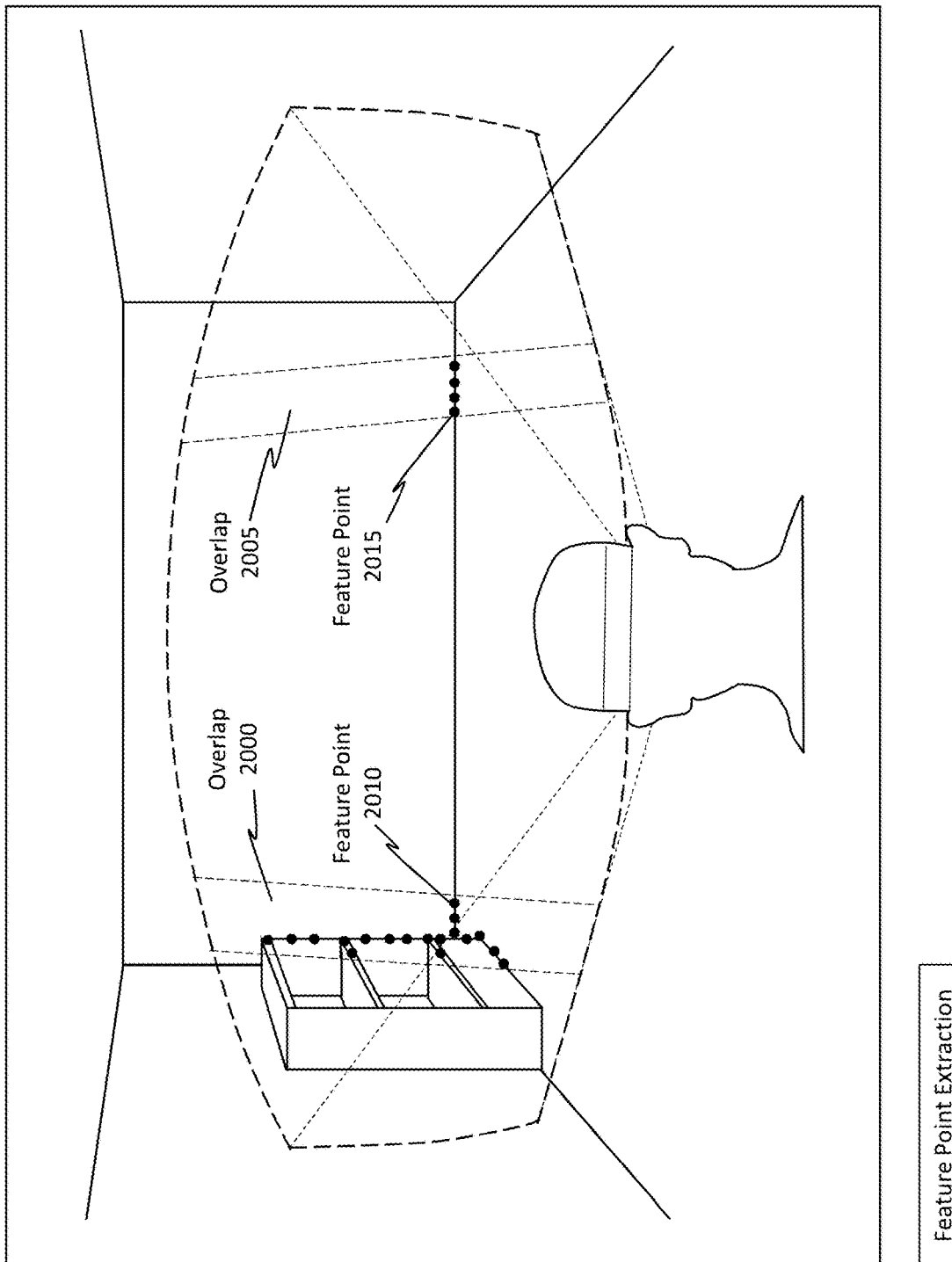
FIG. 20 shows a feature point extraction process, where the identified feature points are used to compute the motion model.

FIG. 20 shows a scenario involving the three different images mentioned throughout this disclosure, namely: a higher resolution image, a first lower resolution image, and a second lower resolution image. The overlap 2000 represents the area where the higher resolution image and one of the lower resolution images overlaps while the overlap 2005 represents the area where the higher resolution image and the other one of the lower resolution images overlaps. In accordance with the disclosed principles, the embodiments are able to analyze the overlap 2000 and the overlap 2005 to identify feature points, such as the feature point 2010 in the overlap 2000 and the feature point 2015 in the overlap 2005. The dark circles represent other identified feature points.

Generally, a "feature point" (e.g., feature points 2010 and 2015) refers to a discrete and identifiable point included within an object or image. Examples of feature points include corners, edges, or other geometric contours having a stark contrast with other areas of the environment. The dark circles shown in FIG. 20 correspond to the corners where walls or other objects meet and where corners or discrete edges are formed and are considered to be feature points. While only a few feature points are illustrated in FIG. 20, one will appreciate how the embodiments are able to identify any number of feature points in an image (e.g., dozens, hundreds, or even thousands).

Identifying feature points may be performed using any type of image analysis, image segmentation, or perhaps even machine learning (ML). Any type of ML algorithm, model, or machine learning may be used to identify feature points. As used herein, reference to "machine learning" or to a ML model may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The embodiments are able to perform a feature point extraction 2020 process on the overlap 2000 and 2005 to identify the feature points that are common between the lower resolution images and the higher resolution image. FIG. 21 provides additional details regarding this feature point extraction or feature point matching process.

FIG. 21 shows a lower resolution image 2100 and a higher resolution image 2105. The lower resolution image 2100 includes an overlap region 2110, which corresponds to an overlap region 2115 included in the higher resolution image 215. Because the two overlap regions 2110 and 2115 correspond to the same content, the feature point 2120A in the lower resolution image 2100 and the feature point 2120B in the higher resolution image 2105 correspond to the same real-world point (e.g., the corner of the shelf). The embodiments are able to analyze the lower resolution image 2100 and the higher resolution image 2105 to identify corresponding features points, such as the feature points 2120A and 2120B.

Identifying these correspondences is referred to as feature matching 2125 and can be performed using any type of machine learning object identification or even pixel intensity information. By performing the feature matching 2125, the embodiments can then align the lower resolution image 2100 with the higher resolution image 2105 and can estimate a geometry of the scene or environment in which the HMD is positioned, as shown by estimated geometry 2130. Additionally, by performing the feature matching 2125, the embodiments can correct any parallax that might be present, as shown by the parallax correction 2135.

As described earlier in method 1900, the embodiments then compute a motion model using the corresponding feature points. FIG. 22 shows an example of a motion model 2200 that may be generated. In some cases, the motion model 2200 of FIG. 22 may simply be a 3D rotational motion model or a 3D rotation matrix 2205 motion model. With a 3D rotation matrix 2205 motion model, the embodiments are able to shift one image by any number of pixels (e.g., perhaps 5 pixels to the left and 10 pixels up) in order to overlay one image onto another image. For instance, once the feature points are identified, the embodiments can identify the pixel coordinates of those feature points or correspondences. Once the coordinates are identified, then the embodiments can generate a rotation base matrix by determining the amount or level of shifting required in order to align the feature points from the third image to the feature points of the first image.

Different types of motion models can be used. For example, motion model 2200 is shown as including a number of different types, including the 3D rotation matrix 2205 motion model, a homography 2210 motion model, an affine motion model 2215, and a similarity transform 2220 motion model. The ellipsis 2225 illustrates how other types of motion models may also be used.

The homography 2210 motion model that incorporates transformations comprising rotation and translation. The affine motion model 2215 is a model that incorporates transformations comprising rotation and shear.

The similarity transform 2220 motion model may be configured to allow for (i) rotation of either one of the higher resolution camera image or the lower resolution camera image, (ii) scaling any of those two images, or (iii) homographic transformations on those two images. In this regard, the similarity transform 2220 motion model approach may be used to determine a rotation base matrix to transform or align the images.

Regardless of which type of motion model is selected, the selected motion model is used to align the lower resolution image with the higher resolution image. Performing this alignment also corrects for parallax, as shown by parallax correction 2230 and as discussed earlier.

Recall, when planar reprojection was used to align the lower resolution images with the higher resolution images, a number of feathering, tapering, or merging operations were additionally performed, such as tone mapping and resolution blending. Such operations can also be performed when the motion model is used to align and merge the images.

To be clear, generating the merged image using the motion model can also include performing tone mapping on a first overlapping region in which the portion of the first lower resolution image overlaps the portion of the higher resolution image and performing tone mapping on a second overlapping region in which the portion of the second lower resolution image overlaps the different portion of the higher resolution image. Generating the merged image using the motion model can further include performing a first resolution blend on the first overlapping region to blend a resolution of the higher resolution image with a first resolution of the first lower resolution image, and performing a second resolution blend on the second overlapping region to blend the resolution of the higher resolution image with a second resolution of the second lower resolution image.

Accordingly, this disclosure presents an improved hardware configuration for an HMD. This improved configuration includes the use of one or more higher resolution cameras and at least two lower resolution cameras. The FOVs of these cameras are designed to only minimally overlap with one another. Using this designed structure, the embodiments can effectively mimic a user's foveal vision acuity. This disclosure also describes a unique and improved technique for merging the resulting higher resolution camera images with the lower resolution camera images. This merging technique can include using a planar reprojection operation or even using a motion model. A number of image quality improvements can also be performed to taper or feather the areas where the lower resolution image and the higher resolution image meet, so as to progressively transition from a higher resolution area to a lower resolution area.

Example Computer/Computer Systems

Attention will now be directed to FIG. 23 which illustrates an example computer system 2300 that may include and/or be used to perform any of the operations described herein. Computer system 2300 may take various different forms. For example, computer system 2300 may be embodied as a tablet 2300A, a desktop or laptop 2300B, a wearable HMD 2300C, a mobile device, or any other type of standalone device, as represented by the ellipsis 2300D. Computer system 2300 may also be a distributed system that includes one or more connected computing components/devices that are in communication with computer system 2300.

In its most basic configuration, computer system 2300 includes various different components. FIG. 23 shows that computer system 2300 includes one or more processor(s) 2305 (aka a "hardware processing unit") and storage 2310. As discussed previously, the computer system 2300 may also include any number or type of cameras.

Regarding the processor(s) 2305, it will be appreciated that the functionality described herein can be performed, at least in part, by one or more hardware logic components (e.g., the processor(s) 2305). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Storage 2310 may be physical system memory, which may be volatile, non-volatile, or some combination of the two. The term "memory" may also be used herein to refer to non-volatile mass storage such as physical storage media. If computer system 2300 is distributed, the processing, memory, and/or storage capability may be distributed as well.

Storage 2310 is shown as including executable instructions (i.e. code 2315). The executable instructions represent instructions that are executable by the processor(s) 2305 of computer system 2300 to perform the disclosed operations, such as those described in the various methods.

The disclosed embodiments may comprise or utilize a special-purpose or general-purpose computer including computer hardware, such as, for example, one or more processors (such as processor(s) 2305) and system memory (such as storage 2310), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2300 may also be connected (via a wired or wireless connection) to external sensors (e.g., one or more remote cameras) or devices via a network 2320. For example, computer system 2300 can communicate with any number devices or cloud services to obtain or process data. In some cases, network 2320 may itself be a cloud network. Furthermore, computer system 2300 may also be connected through one or more wired or wireless networks 2320 to remote/separate computer systems(s) that are configured to perform any of the processing described with regard to computer system 2300.

A "network," like network 2320, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2300 will include one or more communication channels that are used to communicate with the network 2320. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to provide higher resolution image content within a central area of a display of the computer system and to provide lower resolution image content within peripheral areas of the display, said computer system comprising:
   a higher resolution camera disposed on the computer system at a central position, the higher resolution camera being configured to provide the higher resolution image content within the central area of the display;
   a first lower resolution camera disposed on the computer system at a first side position of the higher resolution camera, wherein:
      the first lower resolution camera is configured to provide first lower resolution image content within a first peripheral area of the display, and a field of view (FOV) of the first lower resolution camera minimally overlaps a FOV of the higher resolution camera, said minimal overlap between the FOV of the first lower resolution camera and the FOV of the higher resolution camera being less than a 10 degree FOV overlap, a second lower resolution camera disposed on the computer system at a second side position of the higher resolution camera, wherein:
the second lower resolution camera is configured to provide second lower resolution image content within a second peripheral area of the display, and
a FOV of the second lower resolution camera minimally overlaps the FOV of the higher resolution camera, said minimal overlap between the FOV of the second lower resolution camera and the FOV of the higher resolution camera being less than a 10 degree FOV overlap.

2. The computer system of claim 1, wherein:
the computer system is a head mounted device (HMD), the higher resolution camera provides higher angular resolution image content and higher spatial resolution image content in the display as compared to image content provided in the display by the first lower resolution camera or the second lower resolution camera,
a resolution of the first lower resolution camera is less than one-third a resolution of the higher resolution camera, and
a resolution of the second lower resolution camera is also less than one-third the resolution of the higher resolution camera.

3. The computer system of claim 1, wherein:
the FOV of the first lower resolution camera overlaps the FOV of the higher resolution camera in a horizontal overlap direction, and
the FOV of the second lower resolution camera overlaps the FOV of the higher resolution camera also in the horizontal overlap direction.

4. The computer system of claim 1, wherein the higher resolution camera, the first lower resolution camera, and the second lower resolution camera are camera types included within a group of camera types comprising visible light cameras, low light cameras, thermal imaging cameras, and infrared cameras.

5. The computer system of claim 1, wherein:
an overall FOV of the display in which image content is displayed is at least 60 degrees wide, and
the FOV of the higher resolution camera is at least 50 degrees wide.

6. The computer system of claim 1, further comprising:
a second higher resolution camera disposed proximate to the higher resolution camera on the computer system, wherein:
a combination of the higher resolution camera and the second higher resolution camera provide binocular vision to perform stereoscopic depth matching, and
a majority of a FOV of the second higher resolution camera overlaps the FOV of the higher resolution camera.

7. A method for merging lower resolution image content with higher resolution image content within a merged image using planar reprojection, said method being performed by a head mounted device (HMD) that includes a higher resolution camera, a first lower resolution camera disposed on the HMD at a first side position of the higher resolution camera, and a second lower resolution camera disposed on the HMD at a second side position of the higher resolution camera, said method comprising:
obtaining i) a higher resolution image from the higher resolution camera, ii) a first lower resolution image from the first lower resolution camera, and iii) a second lower resolution image from the second lower resolution camera;
selecting a depth to planarly reproject the first lower resolution image and the second lower resolution image;
using the selected depth to planarly reproject a first texture map plane represented by the first lower resolution image onto a texture map plane represented by the higher resolution image such that the first lower resolution image is planarly reprojected;
using the selected depth to planarly reproject a second texture map plane represented by the second lower resolution image onto the texture map plane represented by the higher resolution image such that the second lower resolution image is planarly reprojected; and
generating a merged image by combining the higher resolution image with the planarly reprojected first lower resolution image and the planarly reprojected second lower resolution image.

8. The method of claim 7, wherein:
a field of view (FOV) of the first lower resolution camera minimally overlaps a FOV of the higher resolution camera, said minimal overlap between the FOV of the first lower resolution camera and the FOV of the higher resolution camera being less than a 10 degree FOV overlap, and
a FOV of the second lower resolution camera minimally overlaps the FOV of the higher resolution camera, said minimal overlap between the FOV of the second lower resolution camera and the FOV of the higher resolution camera being less than a 10 degree FOV overlap.

9. The method of claim 8, wherein generating the merged image includes:
performing tone mapping on a first overlapping region in which a portion of the planarly reprojected first lower resolution image overlaps the higher resolution image; and
performing tone mapping on a second overlapping region in which a portion of the planarly reprojected second lower resolution image overlaps the higher resolution image.

10. The method of claim 9, wherein generating the merged image includes:
performing a first resolution blend on the first overlapping region to blend a resolution of the higher resolution image with a first resolution of the planarly reprojected first lower resolution image; and
performing a second resolution blend on the second overlapping region to blend the resolution of the higher resolution image with a second resolution of the planarly reprojected second lower resolution image.

11. The method of claim 7, wherein the selected depth is more than 5 meters away from the HMD.

12. The method of claim 7, wherein merging the planarly reprojected first lower resolution image with the higher resolution image results in the merged image having an increased horizontal field of view (FOV) as compared to a horizontal FOV of the higher resolution image.

13. The method of claim 7, wherein, as a result combining the higher resolution image with the planarly reprojected first lower resolution image and the planarly reprojected second lower resolution image, the merged image includes higher resolution image content within a central area of the merged image and lower resolution image content at peripheral areas of the merged image.

14. A method for merging lower resolution image content with higher resolution image content within a merged image using a motion model, said method being performed by a head mounted device (HMD) that includes a higher resolution camera, a first lower resolution camera disposed on the HMD at a first side position of the higher resolution camera, and a second lower resolution camera disposed on the HMD at a second side position of the higher resolution camera, said method comprising:
  obtaining i) a higher resolution image from the higher resolution camera, ii) a first lower resolution image from the first lower resolution camera, and iii) a second lower resolution image from the second lower resolution camera, wherein:
    a portion of the first lower resolution image overlaps with a portion of the higher resolution image, and
    a portion of the second lower resolution image overlaps with a different portion of the higher resolution image;
  performing feature matching to identify a first set of corresponding feature points that are common between the portion of the first lower resolution image that overlaps with the portion of the higher resolution image;
  performing feature matching to identify a second set of corresponding feature points that are common between the portion of the second lower resolution image that overlaps with the different portion of the higher resolution image;
  computing a motion model using the first set of corresponding feature points and the second set of corresponding feature points; and
  based on the computed motion model, generating a merged image by combining the higher resolution image with the first lower resolution image and with the second lower resolution image.

15. The method of claim 14, wherein the motion model is one of: a three-dimensional (3D) rotation matrix motion model, a homography motion model, an affine motion model, or a similarity transform motion model.

16. The method of claim 14, wherein generating the merged image includes:
  performing tone mapping on a first overlapping region in which the portion of the first lower resolution image overlaps the portion of the higher resolution image; and
  performing tone mapping on a second overlapping region in which the portion of the second lower resolution image overlaps the different portion of the higher resolution image.

17. The method of claim 16, wherein generating the merged image includes:
  performing a first resolution blend on the first overlapping region to blend a resolution of the higher resolution image with a first resolution of the first lower resolution image; and
  performing a second resolution blend on the second overlapping region to blend the resolution of the higher resolution image with a second resolution of the second lower resolution image.

18. The method of claim 14, wherein:
  a field of view (FOV) of the first lower resolution camera minimally overlaps a FOV of the higher resolution camera, said minimal overlap between the FOV of the first lower resolution camera and the FOV of the higher resolution camera being less than a 10 degree FOV overlap, and
  as a result of said minimal overlap being less than 10 degrees, the portion of the first lower resolution image that overlaps with the portion of the higher resolution image is also less than 10 degrees.

19. The method of claim 18, wherein:
  a FOV of the second lower resolution camera minimally overlaps the FOV of the higher resolution camera, said minimal overlap between the FOV of the second lower resolution camera and the FOV of the higher resolution camera also being less than 10 degrees, and
  as a result of said minimal overlap between the FOV of the second lower resolution camera and the FOV of the higher resolution camera being less than 10 degrees, the portion of the second lower resolution image that overlaps with the different portion of the higher resolution image is also less than 10 degrees.

20. The method of claim 14, wherein:
  the higher resolution camera provides higher angular resolution image content and higher spatial resolution image content as compared to image content provided by the first lower resolution camera or the second lower resolution camera,
  a resolution of the first lower resolution camera is less than one-third a resolution of the higher resolution camera, and
  a resolution of the second lower resolution camera is also less than one-third the resolution of the higher resolution camera.

* * * * *